United States Patent
Higgins et al.

(10) Patent No.: US 8,554,623 B2
(45) Date of Patent: Oct. 8, 2013

(54) METHOD AND APPARATUS FOR SOCIAL NETWORK MARKETING WITH CONSUMER REFERRAL

(75) Inventors: Christopher William Higgins, Portland, OR (US); Marc Davis, San Francisco, CA (US); Joseph O'Sullivan, Oakland, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1028 days.

(21) Appl. No.: 12/041,054

(22) Filed: Mar. 3, 2008

(65) Prior Publication Data
US 2009/0222302 A1    Sep. 3, 2009

(51) Int. Cl.
*G06Q 30/00*    (2012.01)

(52) U.S. Cl.
USPC ............... 705/14.49; 705/14.4; 705/14.73; 705/14.53; 705/14.54; 705/14.55; 705/14.2; 705/14.25

(58) Field of Classification Search
None
See application file for complete search history.

(56) References Cited

U.S. PATENT DOCUMENTS

| | | | |
|---|---|---|---|
| 5,446,891 A | 8/1995 | Kaplan et al. | |
| 5,493,692 A | 2/1996 | Theimer et al. | |
| 5,583,763 A | 12/1996 | Atcheson et al. | |
| 5,651,068 A | 7/1997 | Klemba et al. | |
| 5,761,662 A | 6/1998 | Dasan | |
| 5,764,906 A | 6/1998 | Edelstein et al. | |
| 5,781,879 A | 7/1998 | Arnold et al. | |
| 5,784,365 A | 7/1998 | Ikeda | |
| 5,794,210 A | 8/1998 | Goldhaber et al. | |
| 5,802,510 A | 9/1998 | Jones | |
| 5,835,087 A | 11/1998 | Herz et al. | |
| 5,903,848 A | 5/1999 | Takahashi | |
| 5,920,854 A | 7/1999 | Kirsch et al. | |
| 6,014,638 A | 1/2000 | Burge et al. | |
| 6,021,403 A | 2/2000 | Horvitz et al. | |
| 6,047,234 A | 4/2000 | Cherveny et al. | |
| 6,098,065 A | 8/2000 | Skillen et al. | |
| 6,112,181 A | 8/2000 | Shear et al. | |
| 6,157,924 A | 12/2000 | Austin | |
| 6,169,992 B1 | 1/2001 | Beall et al. | |

(Continued)

FOREIGN PATENT DOCUMENTS

| | | |
|---|---|---|
| EP | 1362302 | 11/2003 |
| JP | 2002-312559 | 10/2002 |

(Continued)

OTHER PUBLICATIONS

PCT Notification of Transmittal of the International Search Report and the Written Opinion of the International Search Authority, PCT Application No. PCT/US2009/034445, dated Oct. 12, 2009, 11 pages.

(Continued)

*Primary Examiner* — Rajesh Khattar
(74) *Attorney, Agent, or Firm* — James J. DeCarlo; Greenberg Traurig, LLP

(57) ABSTRACT

A service provider facilitates consumption of goods, brands, or services on an interactive network using characterizations of consumers, behavior, brands, consumable goods, advertisers, and advocates to determine a three-way match between a consumable good, a consumer, and an advocate. The matching method determines one or more likely consumers by maximizing the estimated contextual value of personalized advocacy. Further, the service provider captures the value of the personalized advocacy in each match, and distributes that value in the form of various marketing incentives.

12 Claims, 9 Drawing Sheets

(56) References Cited

U.S. PATENT DOCUMENTS

| | | |
|---|---|---|
| 6,212,552 B1 | 4/2001 | Biliris et al. |
| 6,266,667 B1 | 7/2001 | Olsson |
| 6,314,365 B1 | 11/2001 | Smith |
| 6,314,399 B1 | 11/2001 | Deligne et al. |
| 6,324,519 B1 | 11/2001 | Eldering |
| 6,327,590 B1 | 12/2001 | Chidlovskii et al. |
| 6,446,065 B1 | 9/2002 | Nishioka et al. |
| 6,490,698 B1 | 12/2002 | Horvitz et al. |
| 6,502,033 B1 | 12/2002 | Phuyal |
| 6,523,172 B1 | 2/2003 | Martinez-Guerra et al. |
| 6,571,279 B1 | 5/2003 | Herz et al. |
| 6,601,012 B1 | 7/2003 | Horvitz et al. |
| 6,662,195 B1 | 12/2003 | Langseth et al. |
| 6,665,640 B1 | 12/2003 | Bennett et al. |
| 6,694,316 B1 | 2/2004 | Langseth et al. |
| 6,701,311 B2 | 3/2004 | Biebesheimer et al. |
| 6,701,315 B1 | 3/2004 | Austin |
| 6,708,203 B1 | 3/2004 | Makar et al. |
| 6,731,940 B1 | 5/2004 | Nagendran |
| 6,741,980 B1 | 5/2004 | Langseth et al. |
| 6,757,661 B1 | 6/2004 | Blaser et al. |
| 6,773,344 B1 | 8/2004 | Gabai et al. |
| 6,781,920 B2 | 8/2004 | Bates et al. |
| 6,785,670 B1 | 8/2004 | Chiang et al. |
| 6,789,073 B1 | 9/2004 | Lunenfeld |
| 6,813,501 B2 | 11/2004 | Kinnunen et al. |
| 6,816,850 B2 | 11/2004 | Culliss |
| 6,829,333 B1 | 12/2004 | Frazier |
| 6,834,195 B2 | 12/2004 | Brandenberg et al. |
| 6,842,761 B2 | 1/2005 | Diamond et al. |
| 6,845,370 B2 | 1/2005 | Burkey et al. |
| 6,850,252 B1 | 2/2005 | Hoffberg |
| 6,853,913 B2 | 2/2005 | Cherveny et al. |
| 6,853,982 B2 | 2/2005 | Smith et al. |
| 6,882,977 B1 * | 4/2005 | Miller ............................ 705/10 |
| 6,904,160 B2 | 6/2005 | Burgess |
| 6,931,254 B1 | 8/2005 | Egner et al. |
| 6,961,660 B2 | 11/2005 | Underbrink et al. |
| 6,961,731 B2 | 11/2005 | Holbrook |
| 6,985,839 B1 | 1/2006 | Motamedi et al. |
| 7,010,492 B1 | 3/2006 | Bassett et al. |
| 7,027,801 B1 | 4/2006 | Hall et al. |
| 7,058,508 B2 | 6/2006 | Combs et al. |
| 7,058,626 B1 | 6/2006 | Pan et al. |
| 7,062,510 B1 | 6/2006 | Eldering |
| 7,065,345 B2 | 6/2006 | Carlton et al. |
| 7,065,483 B2 | 6/2006 | Decary et al. |
| 7,069,308 B2 | 6/2006 | Abrams |
| 7,073,129 B1 | 7/2006 | Robarts et al. |
| 7,110,776 B2 | 9/2006 | Sambin |
| 7,143,091 B2 | 11/2006 | Charnock et al. |
| 7,149,696 B2 | 12/2006 | Shimizu et al. |
| 7,181,438 B1 | 2/2007 | Szabo |
| 7,185,286 B2 | 2/2007 | Zondervan |
| 7,194,512 B1 | 3/2007 | Creemer et al. |
| 7,203,597 B2 | 4/2007 | Sato et al. |
| 7,209,915 B1 | 4/2007 | Taboada et al. |
| 7,219,013 B1 | 5/2007 | Young et al. |
| 7,236,969 B1 | 6/2007 | Skillen et al. |
| 7,254,581 B2 | 8/2007 | Johnson et al. |
| 7,257,570 B2 | 8/2007 | Riise et al. |
| 7,305,445 B2 | 12/2007 | Singh et al. |
| 7,320,025 B1 | 1/2008 | Steinberg et al. |
| 7,343,364 B2 | 3/2008 | Bram et al. |
| 7,395,507 B2 | 7/2008 | Robarts et al. |
| 7,404,084 B2 | 7/2008 | Fransdonk |
| 7,437,312 B2 | 10/2008 | Bhatia et al. |
| 7,451,102 B2 | 11/2008 | Nowak |
| 7,461,168 B1 | 12/2008 | Wan |
| 7,496,548 B1 | 2/2009 | Ershov |
| 7,522,995 B2 | 4/2009 | Nortrup |
| 7,529,811 B2 | 5/2009 | Thompson |
| 7,562,122 B2 | 7/2009 | Oliver et al. |
| 7,577,665 B2 | 8/2009 | Rameer et al. |
| 7,584,215 B2 | 9/2009 | Saari et al. |
| 7,624,104 B2 | 11/2009 | Berkhin et al. |
| 7,624,146 B1 | 11/2009 | Brogne et al. |
| 7,634,465 B2 | 12/2009 | Sareen et al. |
| 7,657,907 B2 | 2/2010 | Fennan et al. |
| 7,681,147 B2 | 3/2010 | Richardson-Bunbury et al. |
| 7,725,492 B2 | 5/2010 | Sittig et al. |
| 7,729,901 B2 | 6/2010 | Richardson-Bunbury et al. |
| 7,769,740 B2 | 8/2010 | Martinez et al. |
| 7,769,745 B2 | 8/2010 | Naaman |
| 7,783,622 B1 | 8/2010 | Vandermolen et al. |
| 7,792,040 B2 | 9/2010 | Nair |
| 7,802,724 B1 | 9/2010 | Nohr |
| 7,822,871 B2 | 10/2010 | Stolorz et al. |
| 7,831,586 B2 | 11/2010 | Reitter et al. |
| 7,865,308 B2 | 1/2011 | Athsani |
| 7,925,708 B2 | 4/2011 | Davis et al. |
| 2001/0013009 A1 | 8/2001 | Greening et al. |
| 2001/0035880 A1 | 11/2001 | Musatov et al. |
| 2001/0047384 A1 | 11/2001 | Croy |
| 2001/0052058 A1 | 12/2001 | Ohran |
| 2002/0014742 A1 | 2/2002 | Conte et al. |
| 2002/0019849 A1 | 2/2002 | Tuvey et al. |
| 2002/0019857 A1 | 2/2002 | Harjanto |
| 2002/0023091 A1 | 2/2002 | Silberberg et al. |
| 2002/0023230 A1 | 2/2002 | Bolnick et al. |
| 2002/0035605 A1 | 3/2002 | McDowell et al. |
| 2002/0049968 A1 | 4/2002 | Wilson et al. |
| 2002/0052786 A1 | 5/2002 | Kim et al. |
| 2002/0052875 A1 | 5/2002 | Smith et al. |
| 2002/0054089 A1 | 5/2002 | Nicholas et al. |
| 2002/0065844 A1 | 5/2002 | Robinson et al. |
| 2002/0069218 A1 | 6/2002 | Sull et al. |
| 2002/0099695 A1 | 7/2002 | Abajian et al. |
| 2002/0103870 A1 | 8/2002 | Shouji |
| 2002/0111956 A1 | 8/2002 | Yeo et al. |
| 2002/0112035 A1 | 8/2002 | Carey |
| 2002/0133400 A1 | 9/2002 | Terry et al. |
| 2002/0138331 A1 | 9/2002 | Hosea et al. |
| 2002/0152267 A1 | 10/2002 | Lennon |
| 2002/0169840 A1 | 11/2002 | Sheldon et al. |
| 2002/0173971 A1 | 11/2002 | Stirpe et al. |
| 2002/0178161 A1 | 11/2002 | Brezin et al. |
| 2002/0198786 A1 | 12/2002 | Tripp et al. |
| 2003/0008661 A1 | 1/2003 | Joyce et al. |
| 2003/0009367 A1 | 1/2003 | Morrison |
| 2003/0009495 A1 | 1/2003 | Adjaoute |
| 2003/0027558 A1 | 2/2003 | Eisinger |
| 2003/0032409 A1 | 2/2003 | Hutcheson et al. |
| 2003/0033331 A1 | 2/2003 | Sena et al. |
| 2003/0033394 A1 | 2/2003 | Stine et al. |
| 2003/0065762 A1 | 4/2003 | Stolorz et al. |
| 2003/0069877 A1 | 4/2003 | Grefenstette et al. |
| 2003/0069880 A1 | 4/2003 | Harrison et al. |
| 2003/0078978 A1 | 4/2003 | Lardin et al. |
| 2003/0080992 A1 | 5/2003 | Haines |
| 2003/0126250 A1 | 7/2003 | Jhanji |
| 2003/0149574 A1 | 8/2003 | Rudman |
| 2003/0154293 A1 | 8/2003 | Zmolek |
| 2003/0165241 A1 | 9/2003 | Fransdonk |
| 2003/0191816 A1 | 10/2003 | Landress et al. |
| 2004/0010492 A1 | 1/2004 | Zhao et al. |
| 2004/0015588 A1 | 1/2004 | Cotte |
| 2004/0030798 A1 | 2/2004 | Andersson et al. |
| 2004/0034752 A1 | 2/2004 | Ohran |
| 2004/0043758 A1 | 3/2004 | Sorvari et al. |
| 2004/0044736 A1 | 3/2004 | Austin-Lane et al. |
| 2004/0070602 A1 | 4/2004 | Kobuya et al. |
| 2004/0139025 A1 | 7/2004 | Coleman |
| 2004/0139047 A1 | 7/2004 | Rechsteiner |
| 2004/0148341 A1 | 7/2004 | Cotte |
| 2004/0152477 A1 | 8/2004 | Wu et al. |
| 2004/0183829 A1 | 9/2004 | Kontny et al. |
| 2004/0201683 A1 | 10/2004 | Murashita et al. |
| 2004/0203851 A1 | 10/2004 | Vetro et al. |
| 2004/0203909 A1 | 10/2004 | Koster |
| 2004/0209602 A1 | 10/2004 | Joyce et al. |
| 2004/0243623 A1 | 12/2004 | Ozer et al. |
| 2004/0260804 A1 | 12/2004 | Grabarnik et al. |
| 2004/0267880 A1 | 12/2004 | Patiejunas |

| | | |
|---|---|---|
| 2005/0005242 A1 | 1/2005 | Hoyle |
| 2005/0015451 A1 | 1/2005 | Sheldon et al. |
| 2005/0015599 A1 | 1/2005 | Wang et al. |
| 2005/0050027 A1 | 3/2005 | Yeh |
| 2005/0050043 A1 | 3/2005 | Pyhalammi et al. |
| 2005/0055321 A1 | 3/2005 | Fratkina et al. |
| 2005/0060381 A1 | 3/2005 | Huynh et al. |
| 2005/0065950 A1 | 3/2005 | Chaganti et al. |
| 2005/0065980 A1 | 3/2005 | Hyatt et al. |
| 2005/0076060 A1 | 4/2005 | Finn et al. |
| 2005/0086187 A1* | 4/2005 | Grosser et al. ................ 706/47 |
| 2005/0105552 A1 | 5/2005 | Osterling |
| 2005/0108213 A1 | 5/2005 | Riise et al. |
| 2005/0120006 A1 | 6/2005 | Nye |
| 2005/0131727 A1 | 6/2005 | Sezan et al. |
| 2005/0149397 A1 | 7/2005 | Morgenstern et al. |
| 2005/0151849 A1 | 7/2005 | Fitzhugh et al. |
| 2005/0159220 A1 | 7/2005 | Wilson et al. |
| 2005/0159970 A1 | 7/2005 | Buyukkokten et al. |
| 2005/0160080 A1 | 7/2005 | Dawson |
| 2005/0165699 A1 | 7/2005 | Hahn-Carlson |
| 2005/0166240 A1 | 7/2005 | Kim |
| 2005/0171955 A1 | 8/2005 | Hull et al. |
| 2005/0177385 A1 | 8/2005 | Hull et al. |
| 2005/0182824 A1 | 8/2005 | Cotte |
| 2005/0183110 A1 | 8/2005 | Anderson |
| 2005/0187786 A1 | 8/2005 | Tsai |
| 2005/0192025 A1 | 9/2005 | Kaplan |
| 2005/0203801 A1 | 9/2005 | Morgenstern et al. |
| 2005/0216295 A1 | 9/2005 | Abrahamsohn |
| 2005/0216300 A1 | 9/2005 | Appelman et al. |
| 2005/0219375 A1 | 10/2005 | Hasegawa et al. |
| 2005/0234781 A1 | 10/2005 | Morgenstern |
| 2005/0273510 A1 | 12/2005 | Schuh |
| 2006/0020631 A1 | 1/2006 | Cheong Wan et al. |
| 2006/0026013 A1 | 2/2006 | Kraft |
| 2006/0026067 A1 | 2/2006 | Nicholas et al. |
| 2006/0031108 A1 | 2/2006 | Oran |
| 2006/0040719 A1 | 2/2006 | Plimi |
| 2006/0047563 A1 | 3/2006 | Wardell |
| 2006/0047615 A1 | 3/2006 | Ravin et al. |
| 2006/0053058 A1 | 3/2006 | Hotchkiss et al. |
| 2006/0069612 A1 | 3/2006 | Hurt et al. |
| 2006/0069616 A1 | 3/2006 | Bau |
| 2006/0069749 A1 | 3/2006 | Herz et al. |
| 2006/0074853 A1 | 4/2006 | Liu et al. |
| 2006/0085392 A1 | 4/2006 | Wang et al. |
| 2006/0085419 A1 | 4/2006 | Rosen |
| 2006/0089876 A1 | 4/2006 | Boys |
| 2006/0116924 A1 | 6/2006 | Angles et al. |
| 2006/0123053 A1 | 6/2006 | Scannell, Jr. |
| 2006/0129313 A1 | 6/2006 | Becker et al. |
| 2006/0129605 A1 | 6/2006 | Doshi |
| 2006/0161894 A1 | 7/2006 | Oustiougov et al. |
| 2006/0168591 A1 | 7/2006 | Hunsinger et al. |
| 2006/0173838 A1 | 8/2006 | Garg et al. |
| 2006/0173985 A1 | 8/2006 | Moore |
| 2006/0178822 A1 | 8/2006 | Lee |
| 2006/0184508 A1 | 8/2006 | Fuselier et al. |
| 2006/0184579 A1 | 8/2006 | Mills |
| 2006/0212330 A1 | 9/2006 | Savilampi |
| 2006/0212401 A1 | 9/2006 | Amerally et al. |
| 2006/0227945 A1 | 10/2006 | Runge et al. |
| 2006/0235816 A1 | 10/2006 | Yang et al. |
| 2006/0236257 A1 | 10/2006 | Othmer et al. |
| 2006/0242139 A1 | 10/2006 | Butterfield et al. |
| 2006/0242178 A1 | 10/2006 | Butterfield et al. |
| 2006/0242259 A1 | 10/2006 | Vallath et al. |
| 2006/0258368 A1 | 11/2006 | Granito et al. |
| 2006/0282455 A1 | 12/2006 | Lee et al. |
| 2007/0013560 A1 | 1/2007 | Casey |
| 2007/0015519 A1 | 1/2007 | Casey |
| 2007/0043766 A1 | 2/2007 | Nicholas et al. |
| 2007/0067104 A1 | 3/2007 | Mays |
| 2007/0067267 A1 | 3/2007 | Ives |
| 2007/0072591 A1 | 3/2007 | McGary et al. |
| 2007/0073583 A1 | 3/2007 | Grouf et al. |
| 2007/0073641 A1 | 3/2007 | Perry et al. |
| 2007/0086061 A1 | 4/2007 | Robbins |
| 2007/0087756 A1 | 4/2007 | Hoffberg |
| 2007/0088852 A1 | 4/2007 | Levkovitz |
| 2007/0100956 A1 | 5/2007 | Kumar |
| 2007/0112762 A1 | 5/2007 | Brubaker |
| 2007/0121843 A1 | 5/2007 | Atazky et al. |
| 2007/0130137 A1 | 6/2007 | Oliver et al. |
| 2007/0136048 A1 | 6/2007 | Richardson-Bunbury et al. |
| 2007/0136235 A1 | 6/2007 | Hess |
| 2007/0136256 A1 | 6/2007 | Kapur et al. |
| 2007/0136689 A1 | 6/2007 | Richardson-Bunbury et al. |
| 2007/0143345 A1 | 6/2007 | Jones et al. |
| 2007/0150168 A1 | 6/2007 | Balcom et al. |
| 2007/0150359 A1 | 6/2007 | Lim et al. |
| 2007/0155411 A1 | 7/2007 | Morrison |
| 2007/0161382 A1 | 7/2007 | Melinger et al. |
| 2007/0162850 A1 | 7/2007 | Adler |
| 2007/0168430 A1 | 7/2007 | Brun et al. |
| 2007/0173266 A1 | 7/2007 | Barnes |
| 2007/0179792 A1 | 8/2007 | Kramer |
| 2007/0185599 A1 | 8/2007 | Robinson et al. |
| 2007/0192299 A1 | 8/2007 | Zuckerberg et al. |
| 2007/0198506 A1 | 8/2007 | Attaran Rezaei et al. |
| 2007/0198563 A1 | 8/2007 | Apparao et al. |
| 2007/0203591 A1 | 8/2007 | Bowerman |
| 2007/0219708 A1 | 9/2007 | Brasche et al. |
| 2007/0233585 A1 | 10/2007 | Ben Simon et al. |
| 2007/0239348 A1 | 10/2007 | Cheung |
| 2007/0239517 A1 | 10/2007 | Chung et al. |
| 2007/0259653 A1 | 11/2007 | Tang et al. |
| 2007/0260508 A1 | 11/2007 | Barry et al. |
| 2007/0260604 A1 | 11/2007 | Haeuser et al. |
| 2007/0271297 A1 | 11/2007 | Jaffe et al. |
| 2007/0271340 A1 | 11/2007 | Goodman et al. |
| 2007/0273758 A1 | 11/2007 | Mendoza et al. |
| 2007/0276940 A1 | 11/2007 | Abraham et al. |
| 2007/0282621 A1 | 12/2007 | Altman et al. |
| 2007/0282675 A1 | 12/2007 | Varghese |
| 2007/0288278 A1 | 12/2007 | Alexander et al. |
| 2008/0005313 A1 | 1/2008 | Flake et al. |
| 2008/0005651 A1 | 1/2008 | Grefenstette et al. |
| 2008/0010206 A1 | 1/2008 | Coleman |
| 2008/0021957 A1 | 1/2008 | Medved et al. |
| 2008/0026804 A1 | 1/2008 | Baray et al. |
| 2008/0028031 A1 | 1/2008 | Bailey et al. |
| 2008/0040283 A1 | 2/2008 | Morris |
| 2008/0046298 A1 | 2/2008 | Ben-Yehuda et al. |
| 2008/0070588 A1 | 3/2008 | Morin |
| 2008/0086356 A1 | 4/2008 | Glassman et al. |
| 2008/0086431 A1 | 4/2008 | Robinson et al. |
| 2008/0091796 A1 | 4/2008 | Story et al. |
| 2008/0096664 A1 | 4/2008 | Baray et al. |
| 2008/0102911 A1 | 5/2008 | Campbell et al. |
| 2008/0104061 A1 | 5/2008 | Rezaei |
| 2008/0104227 A1 | 5/2008 | Birnie et al. |
| 2008/0109761 A1 | 5/2008 | Stambaugh |
| 2008/0109843 A1 | 5/2008 | Ullah |
| 2008/0114751 A1 | 5/2008 | Cramer et al. |
| 2008/0120183 A1 | 5/2008 | Park |
| 2008/0120308 A1 | 5/2008 | Martinez et al. |
| 2008/0120690 A1 | 5/2008 | Norlander et al. |
| 2008/0133750 A1 | 6/2008 | Grabarnik et al. |
| 2008/0147655 A1 | 6/2008 | Sinha et al. |
| 2008/0147743 A1 | 6/2008 | Taylor et al. |
| 2008/0148175 A1 | 6/2008 | Naaman et al. |
| 2008/0154720 A1 | 6/2008 | Gounares |
| 2008/0163284 A1 | 7/2008 | Martinez et al. |
| 2008/0172632 A1 | 7/2008 | Stambaugh |
| 2008/0177706 A1 | 7/2008 | Yuen |
| 2008/0255989 A1* | 10/2008 | Altberg et al. ................ 705/40 |
| 2008/0270579 A1 | 10/2008 | Herz et al. |
| 2008/0285886 A1 | 11/2008 | Allen |
| 2008/0301250 A1 | 12/2008 | Hardy et al. |
| 2008/0320001 A1 | 12/2008 | Gaddam |
| 2009/0005987 A1 | 1/2009 | Vengroff et al. |
| 2009/0006336 A1 | 1/2009 | Forstall et al. |
| 2009/0012934 A1 | 1/2009 | Yerigan |
| 2009/0012965 A1 | 1/2009 | Franken |
| 2009/0043844 A1 | 2/2009 | Zimmet et al. |
| 2009/0044132 A1 | 2/2009 | Combel et al. |

| | | | |
|---|---|---|---|
| 2009/0063254 A1 | 3/2009 | Paul et al. | |
| 2009/0070186 A1 | 3/2009 | Buiten et al. | |
| 2009/0073191 A1 | 3/2009 | Smith et al. | |
| 2009/0076889 A1 | 3/2009 | Jhanji | |
| 2009/0100052 A1 | 4/2009 | Stern et al. | |
| 2009/0106356 A1 | 4/2009 | Brase et al. | |
| 2009/0125517 A1 | 5/2009 | Krishnaswamy et al. | |
| 2009/0132941 A1 | 5/2009 | Pilskalns et al. | |
| 2009/0144141 A1 | 6/2009 | Dominowska et al. | |
| 2009/0150501 A1 | 6/2009 | Davis et al. | |
| 2009/0150507 A1 | 6/2009 | Davis et al. | |
| 2009/0165051 A1 | 6/2009 | Armaly | |
| 2009/0171939 A1 | 7/2009 | Athsani et al. | |
| 2009/0177603 A1 | 7/2009 | Honisch | |
| 2009/0187637 A1 | 7/2009 | Wu et al. | |
| 2009/0204484 A1 | 8/2009 | Johnson | |
| 2009/0204672 A1 | 8/2009 | Jetha et al. | |
| 2009/0204676 A1 | 8/2009 | Parkinson et al. | |
| 2009/0216606 A1 | 8/2009 | Coffman et al. | |
| 2009/0222302 A1 | 9/2009 | Higgins | |
| 2009/0222303 A1 | 9/2009 | Higgins | |
| 2009/0222304 A1 | 9/2009 | Higgins | |
| 2009/0234814 A1 | 9/2009 | Boerries et al. | |
| 2009/0234909 A1 | 9/2009 | Strandell et al. | |
| 2009/0249482 A1 | 10/2009 | Sarathy | |
| 2009/0265431 A1 | 10/2009 | Jania et al. | |
| 2009/0281997 A1 | 11/2009 | Jain | |
| 2009/0299837 A1 | 12/2009 | Steelberg et al. | |
| 2009/0313546 A1 | 12/2009 | Katpelly et al. | |
| 2009/0320047 A1 | 12/2009 | Khan et al. | |
| 2009/0323519 A1 | 12/2009 | Pun | |
| 2009/0328087 A1 | 12/2009 | Higgins et al. | |
| 2010/0002635 A1 | 1/2010 | Eklund | |
| 2010/0014444 A1 | 1/2010 | Ghanadan et al. | |
| 2010/0063993 A1 | 3/2010 | Higgins et al. | |
| 2010/0070368 A1 | 3/2010 | Choi et al. | |
| 2010/0118025 A1 | 5/2010 | Smith et al. | |
| 2010/0125563 A1 | 5/2010 | Nair et al. | |
| 2010/0125569 A1 | 5/2010 | Nair et al. | |
| 2010/0125604 A1 | 5/2010 | Martinez et al. | |
| 2010/0125605 A1 | 5/2010 | Nair et al. | |
| 2010/0185642 A1 | 7/2010 | Higgins et al. | |

FOREIGN PATENT DOCUMENTS

| | | |
|---|---|---|
| JP | 2002312559 | 10/2002 |
| KR | 1020000036897 | 7/2000 |
| KR | 1020000054319 | 9/2000 |
| KR | 10-2000-0064105 | 11/2000 |
| KR | 1020030049173 | 6/2003 |
| KR | 10-0801662 | 2/2005 |
| KR | 1020060043333 | 5/2006 |
| KR | 102007034094 | 3/2007 |
| KR | 1020070073180 | 7/2007 |
| KR | 10-0801622 | 2/2008 |
| KR | 1020080048802 | 6/2008 |
| WO | WO2006/116196 | 11/2006 |
| WO | WO 2007/022137 | 2/2007 |
| WO | WO 2007/027453 | 3/2007 |
| WO | WO 2007070358 | 6/2007 |
| WO | WO2007113546 | 10/2007 |

OTHER PUBLICATIONS

International Search Report and Written Opinion for PCT/US2009/034444, Sep. 18, 2009.
Office Action for U.S. Appl. No. 12/041,088, Oct. 4, 2010.
Office Action for U.S. Appl. No. 12/041,062, Oct. 28, 2010.
U.S. Appl. No. 12/241,590, filed Sep. 30, 2008, Athsani.
U.S. Appl. No. 12/409,867, filed Mar. 24, 2009, King.
U.S. Appl. No. 12/540,098, filed Aug. 12, 2009, Martinez.
U.S. Appl. No. 12/536,892, filed Aug. 6, 2009, King.
U.S. Appl. No. 12/540,588, filed Aug. 13, 2009, Tendjoukian.
U.S. Appl. No. 12/015,115, filed Jan. 16, 2006, Higgins.
U.S. Appl. No. 12/180,486, filed Jul. 25, 2008, Higgins.
U.S. Appl. No. 12/180,499, filed Jul. 25, 2008, Higgins.
U.S. Appl. No. 12/041,088, filed Mar. 3, 2008, Higgins.
U.S. Appl. No. 12/015,146, filed Jan. 16, 2008, Higgins.
U.S. Appl. No. 12/041,062, filed Mar. 3, 2008, Higgins.
U.S. Appl. No. 12/540,269, filed Aug. 12, 2009, Kalaboukis.
U.S. Appl. No. 11/969,815, filed Jan. 4, 2004, Davis.
U.S. Appl. No. 12/182,111, filed Jul. 29, 2008, Davis.
U.S. Appl. No. 12/434,575, filed May 1, 2009, O'Sullivan.
U.S. Appl. No. 12/434,580, filed May 1, 2009, O'Sullivan.
U.S. Appl. No. 12/407,690, filed Mar. 19, 2009, Davis.
U.S. Appl. No. 12/407,681, filed Mar. 19, 2009, Athsani.
International Search Report (PCT/US2009/030405) dated Sep. 23, 2009; 2 pages.
U.S. Appl. No. 12/041,054 file history dated Mar. 3, 2008; 64 pgs.
U.S. Appl. No. 12/041,062 file history dated Mar. 3, 2008; 66 pgs.
U.S. Appl. No. 12/041,088 file history dated Mar. 3, 2008; 66 pgs.
U.S. Appl. No. 12/169,931 file history dated Jul. 9, 2008; 66 pgs.
U.S. Appl. No. 12/170,025 file history dated Jul. 9, 2008; 67 pgs.
U.S. Appl. No. 12/180,499 file history dated Jul. 25, 2008; 67 pgs.
U.S. Appl. No. 12/180,486 file history dated Jul. 25, 2008; 65 pgs.
International Search Report PCT/US2009/030406 dated Sep. 29, 2009; 5 pages.
International Search Report and Written Opinion PCT/US2009/034445 dated Oct. 12, 2009; 7 pages.
Office Action U.S. Appl. No. 12/041,054 dated Oct. 27, 2010; 15 pages.
Office Action U.S. Appl. No. 12/041,062 dated Oct. 28, 2010; 12 pages.
International Search Report PCT/US2009/034444 dated Sep. 18, 2009; 2 pages.
Office Action U.S. Appl. No. 12/041,088 dated Oct. 4, 2010; 18 pages.
Almieda, R.B. et al. "A Community-Aware Search Engine," WWW2004, New York., NY, May 17-22, 2004, pp. 413-421.
Anonymous. (Jul. 16, 2006). MyFantasyLeague Fantasy Football League Management—Features, located at <http://web.archive.org/web/20060716072900/www.myfantasyleague.com/features.htm >, last visited on Feb. 10, 2009, four pages.
Anonymous. (Jul. 17, 2006). "Fantasy Football Lineup Analyzer—Tips for Who to Start & Who to Bench each Week," located at http://web.archive.org/web/200607171633529/www.fantasyfootballstarters.com/lineupAnalyzer.jsp>, last visited on Feb. 10, 2009, one page.
Bharat, K. (Date Unknown). "SearchPad: Explicit Capture of Search Context to Support Web Search," located at <http://www9.org/w9cdrom/173/173.html >, last visited Aug. 1, 2007, 13 pages.
Budzik, J. et al. (2000). "User Interactions with Everyday Applications as Context for Just-in-Time Information Access," Proceeding of the 2000 Conference on Intelligent User Interfaces, eight pages.
Finkelstein, L. et al. (2001). "Placing Search in Context: The Concept Revisited," WWW/O, Hong Kong, May 2-5, 2001, pp. 406-414.
Freyne, J. et al. (2004). "Further Experiments on Collaborative Ranking in Community-Based Web Search," Artificial Intelligence Review, pp. 1-23.
Lieberman, H. (1995) "Letizia: An Agent that Assists Web Browsing," Proceedings of the Fourteenth International Joint Conference on Artifical Intelligence, Aug. 20-25, 1995, six pages.
Mitra, M. et al. (1998). "Improving Automatic Query Expansion," Proceedings of the AMC SIGIR, nine pages.
Rhodes, B.J. et al. (1996). "Remembrance Agent: A Continuously Running Automated Information Retrieval System," Proceedings of the First International Conference on the Practical Application of Intelligent Agents and Multi Agent Technology (PAAM), pp. 487-495, located at <http://www.cc.gatech.edu/fac/Thad.Starner/p/032_40_agents&ubicomp/remembrance-agent . . . >, last visited Aug. 1, 2007, six pages.
Sansbury, C. (Sep. 13, 2005). "Yahoo! Widget for BBC Sports News—Scotland," 32. located at <http://widgets.yahoo.com/gallery/view.php?widget=37220 >, last visited on Feb. 7, 2007, one page.
Yahoo! Inc. (Dec. 7, 2005). "Yahoo! Widget Engine 3.0 Reference Manual Version 3.0," 300 pages.
U.S. Appl. No. 12/407,690, filed Mar. 19, 2009; 50 pages.
U.S. Appl. No. 12/407,681, filed Mar. 19, 2009; 56 pages.
International Search Report PCT/US2008/088228 dated Sep. 30, 2009—2 pages.
Written Opinion PCT/US2008/088228 dated Sep. 30, 2009—5 pages.

U.S. Appl. No. 11/617,451, filed Dec. 28, 2006, Kalaboukis.
U.S. Appl. No. 11/562,973, filed Nov. 22, 2006, Martinez.
U.S. Appl. No. 11/562,974, filed Nov. 22, 2006, Martinez.
U.S. Appl. No. 11/562,976, filed Nov. 22, 2006, Martinez.
U.S. Appl. No. 11/562,979, filed Nov. 22, 2006, Martinez.
U.S. Appl. No. 12/237,709, filed Sep. 25, 2008, Martinez.
U.S. Appl. No. 12/399,669, filed Mar. 6, 2009, King.
U.S. Appl. No. 11/353,657, filed Feb. 13, 2006, Mor Naaman.
U.S. Appl. No. 11/437,344, filed May 19, 2006, Jaffe.
U.S. Appl. No. 11/593,869, filed Nov. 6, 2006, Mor Naaman.
U.S. Appl. No. 11/593,668, filed Nov. 6, 2006, Mor Naaman.
Allen James F., "Maintaining Knowledge About Temporal Intervals", Communications of the ACM, Nov. 1983, vol. 26, No. 11 pp. 832-843; 12 pages.
Press Release, "Qualcomm Conducts First Live Demonstration of FL Technology on a Wireless Handset", Qualcomm Inc., San Diego, Sep. 27, 2005; 3 pages.
MediaFlo, FLO Technology Overview, Qualcomm Inc. Copyright 2007; 24 pages.
Axup, Jeff et al., "Conceptualizing New Mobile Devices by Observing Gossip and Social Network Formation Amongst the Extremely Mobile", ITEE Technical Report #459, Dec. 19, 2005, pp. 1-71.
Conhaim, Wallys W., "Social networks: the Internet continues to evolve: where is the money in all this? That is what venture capitalists are asking. (Perspectives)", Information Today, 22, 9, 35(2), Oct. 2005, (pp. 1-5 of attached).
Davis, Marc et al., "From Context to Content: Leveraging Context to Infer Media Metadata", ACM Press, Oct. 10, 2004, pp. 1-8.
Kaasinen, E., "Behaviour & Information Technology", Taylor & Francis, vol. 24, No. 1, Jan./Feb. 2005, pp. 37-49, (Abstract only attached).
Konomi, Shin'ichi et al., "Supporting Colocated Interactions Using RFID and Social Network Displays", Pervasive Computing, Jul.-Sep. 2006 , vol. 5, No. 3, pp. 48-56 (pp. 1-4 of attached).
Lin, F. et al., "A unified framework for managing Web-based services.", Information Systems and e-Business Management, vol. 3, Oct. 2005, p. 299, (pp. 1-15 of attached).
Metz, Cade, "MySpace Nation", PC Magazine, Jun. 21, 2006, pp. 1-10 attached.
Perkowitz, Mike et al., "Utilizing Online Communities to Facilitate Physical World Interactions", The International Conference on Communities and Technologies, Sep. 19, 2003, Amsterdam, pp. 1 6.
Roush, Wade, "Social Machines", Continuous Computing Blog, Jul. 5, 2005, pp. 1-21.
Roush, Wade, "Social Machines", Technology Review, Aug. 2005, pp. 45-51.
Sheppard, Brett, "The Rights Stuff: The Integration of Enterprise Digital Rights Management into an Enterprise Architecture", ECantent, vol. 29, No. 9, Nov. 2006, p. 38, 40-44, (pp. 1-7 of attached).
Voight, Joan et al., "Lessons for Today's Digital Market", Adweekcom, Oct. 2, 2006, pp. 1-6.
"Companies add new communication features to photo sharing.", Digital Imaging Digest, Feb. 2006, pp. 1-2.
"Dave.TV and Eye Music Network Empower Users to Create Their Own Music TV Channel on Their Sites With New IPTV Channel", www.davenw.com/2006, Sep. 13, 2006, pp. 1-2.
"Digital rights management: a primer: developing a user-friendly means of protecting content.(Profile)", Screen Digest, No. 420, p. 305, Sep. 2006, (pp. 1-9 of attached).
"Emerging Markets: What media 2.0 can offer advertisers.", Campaign, Oct. 27, 2006, p. 26, (pp. 1-5 of attached).
"Reality Digital Debuts Opus", www.lightreading.com. Sep. 25, 2006, pp. 1.
"Reality Digital—Making Media Move", www.realitydigital.com, Nov. 28, 2006, pp. 1-2.
Notification of The International Search Report and The Written Opinion of The International Search Authority, or Declaration (PCT/US2007/'084797) dated Mar. 21, 2008; 11 pages.
International Search Report (PCT/US2007/084807) dated May 27, 2008; 3 pages.
International Preliminary Report on Patentability (PCT/US2007/084807) dated May 26, 2009; 5 pages.
International Search Report (PCT/US2010/026063) dated May 27, 2008; 3 pages.
Rekimoto, et al., "CyberCode: designing augmented reality environments with visual tags."Proceedings of DARE 2000 on Designing augmented reality environments, Elsinore, Denmark, pp. 1-11 Apr. 12-14, 2000.
"Semacode—URL Barcodes-practical ubiquitous computing", located at http://semacode.org visited on Apr. 13, 2007; 3 pages.
"Technical White Paper: Choosing the best 2D barcode format for mobile apps,"Semacode, Jul. 15, 2006; pp. 1-7 located at http://semacode.org/about/technical/whitepaper/best2_d_code.pdf.
Carbonell, J. et al. (Aug. 24-28, 1998). "The Use of MMR, Diversity-Based Reranking for Reordering Documents and Producing Summaries," SIGIR '98: Proceedings of the 21 S Annual International ACM SIGIR Conference on Research and Development in Information Retrieval: Melbourne, Australia W.B. Croft et al. eds., pp. 335-336.
Cooper, M. et al. (Nov. 2-8, 2003). "Temporal Event Clustering for Digital Photo Collections," MM'03 Berkeley, California, pp. 364-373.
Davis, M. et al. (Oct. 10-16, 2004). "From Context to Content: Leveraging Context to Infer Media Metadata," MM'04 New York, New York. 9 pages.
Davis, M. et al. "From Context to Content: Leveraging Context for Mobile Media Metadata." 9 pages.
Davis. M. et al. (Apr. 2-7, 2005). "MMM2: Mobile Media Metadata for Media Sharing," CHI 2005 Portland, Oregon. 4 pages.
Davis, M. et al. "Mobile Media Metadata for Mobile Imaging." Jun. 27-30, 2004; 4 pages.
Davis, M. et al. "Using Context and Similarity for Face and Location Identification."10 pages.
Flickr. Welcome to Flickr—Photo Sharing, located at <http://www.flickr.com > visited on Feb. 26, 2007, one page.
Gargi, U. (Aug. 7, 2003). "Consumer Media Capture: Time-Based Analysis and Event Clustering," Technical Report HPL-2003-165 HP Laboratories Palo Alto, pp. 1-15.
Goldberger, J. et al. The Hungarian Clustering Method, located at <http://scholar.googles.com/scholar?num=20&h1=en&lr=&9=cache:vbwslsm1CisJ:www.openu . acil/Personal_sites/tarnirtassa/Publications/hcm.pdf+goldberger+clustering+Method+hungarian> visited on Mar. 1, 2007, twelve pages.
Graham, A. et al. (Jul. 13-17, 2002). Time as Essence for Photo Browsing Through Personal Digital Libraries, JCDL '02 Portland, Oregon. 11 pages.
Jaffe, A. et al. (May 23-26, 2006). "Generating Summaries for Large Collections of Geo-Referenced Photographs," WWW 2006 Edinburgh, Scotland. 2 pages.
Jaffe, A. et al. (Oct. 26-27, 2006). "Generating Summaries and Visualization for Large Collections of Geo-Referenced Photographs," MIR '06 Santa Barbara, California. 11 pages.
Joshi, D. et al. (Oct. 15-16, 2004). "The Story Picturing Engine: Finding Elite Images to Illustrate a Story Using Miitual Reinforcement," MIR '04 New York, New York. 9 pages.
Naaman, M. et al. (Nov. 2003). "From Where to What: Metadata Sharing for Digital Photographs with Geographic Coordinates," In on the Move to Meaningful Internet Systems 2003: Coop/S, DOA, and Odbase R. Meersman et al. eds., pp. 196-217.
Naaman, M. et al. (Jun. 7-11, 2004). "Automatic Organization for Digital Photographs with Geographic Coordinates" Proceedings of the Fourth ACM/IEEE Joint Conference on Digital Libraries Global Reach and Diverse Impact: Tucson, Arizona, pp. 53-62.
Nair, R. et al. (Nov. 6-11, 2005). "Photo L01: Browsing Multi-User Photo Collections," MM'05 Singapore, pp. 223-224.
0' Hare, N. et al. "Combination of Content Analysis and Context Features for Digital Photograph Retrieval." 7 pages.
Pigeau, A. et al. (Jun. 17, 2005). "Organizing a Personal Image Collection with Statistical Model-Based ICL Clustering on Spatio-Temporal Camera Phone Meta-Data." 25 pages.
Sarvas, R. et al. (Jun. 6-9, 2004). "Metadata Creation System for Mobile Images," MobiSys'04 Boiton, Massachusetts, pp. 36-48.
Toyama, K. et al. (Nov. 2-8, 2003). "Geographic Location Tags on Digital Images," MM '03'Berkeley: California. 12 pages.

Nedos, A; Singh K., Clarke S, Proximity Based Group Communications for Mobile AD HOC Networks'; Proximity-Based Group Communication; Global Smart Spaces; D.14; Oct. 3, 2003; 31 pages.
Brunato, M; Battiti R. "Pilgrim: A Location Broker and Mobility—Aware Recommendation System"; Technical report DIT-02-0092, Universita di Trento, Oct. 2002; 8 pages.
Backstrom et al., Spatial Variation in Search Engine Queries, WWW•2008, Beijing, China (Apr. 21-25, 2008).
Gan et al., Analysis of Geographic Queries in a Search Engine Log, LocWeb 2008, Beijing, China (Apr. 22, 2008).
Jones et al., Geographic Intention and Modification in Web Search, International Journal of Geographical Information Science, vol. 22, No. 3, pp. 1-20 (Jul. 2008).
Sanderson et al., Analyzing Geographic Queries; Department of Information Studies; University of Sheffield, UK; 2 pages.
Go With the Flow, The Economist Technology Quarterly, vol. 382, Issue 8519, 4 pages, (Mar. 10, 2007).
International Search Report and Written Opinion (PCT/US2009/060476) dated May 4, 2010; 12 pages.
International Search Report and Written Opinion (PCT/US2009/060374) dated Apr. 30, 2010; 12 pages.
International Search Report (PCT/US2009/060379) dated Apr. 30, 2010; 3 pages.
International Search Report and Written Opinion (PCT/US2008/085135) dated May 25, 2009; 7 pages.
International Search Report (PCT/US2009/055503) dated Apr. 8, 2010; 3 pages.
Written Opinion (PCT/US2008/085915) dated Jun. 29, 2009; 4 pages.
Written Opinion (PCT/US2008/086948) dated May 21, 2009; 5 pages.
International Search Report and Written Opinion (PCT/US2009/051247) dated Jan. 25, 2010; 9 pages.
International Search Report and Written Opinion (PCT/US2009/046258) dated Dec. 23, 2009; 7 pages.
U.S. Appl. No. 11/593,668, filed Nov. 6, 2006 for Naaman, et al.
U.S. Appl. No. 11/593,869, filed Nov. 6, 2006 for Naaman, et al.
"Gutenkarte" Book Catalog, 2006 MetaCarta, Inc., www.gutenkarte.org 11pgs.
Baron, N.S. et al. (Aug. 30, 2005). "Tethered or Mobile? Use of Away Messages in Instant Messaging by American College Students," Chapter 20.1 in Mobile Communication, Springer: London, England, 31:293-297.
Jones, C. et al. (2004). "Ad-Hoc Meeting System," Final Presentation from Project Group #7, SIMS 202, Fall 2004 Class, UC Berkley School of Information Management & Systems, located at <http://www2.sims.berkeley.edu/academics/courses/is202/f04/phone_project/Group7/ >, last visited on Feb. 2, 2010, thirteen pages.
Manguy, L. et al. (2006). "iTour—Packing the World Into Your Mobile Device," Final Presentation from Project Group #6, SIMS 202, Fall 2004 Class, UC Berkley School of Information Management & Systems, located at <http://www2.sims.berkeley.edu/academics/courses/is202/f04/phone_project/Group6/index.h > . . . last visited on Feb. 2, 2010, ten pages.
Mitnick, S. et al. (2004). "Pillbox," Final Presentation from Project Group #8, SIMS: 02: Fall 2004 Class, UC Berkley School of Information Management & Systems, located at <http://www2.sims.berkeley.edu/academics/courses/is202/f04/phone_project/Group8/about.p . . . ,> last visited on Feb. 2, 2010, seventeen pages.
Wooldridge, M. et al. (2005). "STALK. The Camera-phone Scavenger Hunt!" located at <http://www.stalk.com >, last visited on Dec. 28, 2009, two pages.
www.stalk.com (retrieved on Dec. 29, 2009) pp. 1-2.
Anonymous. (Date Unknown). "CommunityWalk—About," located at <http://www.communitywalk.com/about >, last visited on Mar. 3, 2008, one page.
Anonymous. (Date Unknown). "CommunityWalk Mapping Made Easy," located at <http://www.communitywalk.com/>, last visited on Mar. 3, 2008, one page.
Anonymous. (Date Unknown). "Google Earth User Guide" located at <http://earth.google.com/userguide/v4/>, last visited on Feb. 27, 2008, twelve pages.
Anonymous. (Date Unknown). "Google Earth—Wikipedia, the Free Encyclopedia," located at <http://en.wikipedia.org/wiki/Google_earth >, last visited on Mar. 3, 2008, fourteen pages.
Anonymous. (Date Unknown). "Google Earth User Guide—Using Image Overlays and 3D Models," located at <http://earth.google.com/userguide/v4/ug_imageoverlays.html >, nine pages.
Anonymous. (Date Unknown). "Google Maps," located at <http://en.wikipedia.org/wiki/Google_maps >, last visited on Feb. 27, 2008, eleven pages.
Anonymous. (Date Unknown). "Live Search Maps," located at <http://en.wikipedia.org/wiki/Windows_live_maps >, last visited on Mar. 3, 2008, six pages.
Anonymous. (Date Unknown). "WikiMapia," located at <http://en.wikipedia.org/wiki/WikiMapia >, last visited on Mar. 3, 2008, three pages.
Anonymous. (2007). "Ask.com Maps & Directions," located at <http://maps.ask.com/maps >, last visited on Mar. 3, 2008, one page.
Anonymous. (2007). "Wayfaring Follow You, Follow Me," located at <http://www.wayfaring.com/>, last visited on Mar. 3, 2008, three pages.
Anonymous. (2008). "Platial the People's Atlas," located at <www.platial.com >, last visited on Mar. 3, 2008, one page.
Anonymous. (2008). "Wikimpaia.org," located at <http://wikimpaia.org/>, last visited on Mar. 3, 2008, one page.
U.S. Appl. No. 12/273,259, filed Dec. 6, 2007, Davis.
U.S. Appl. No. 11/958,157, filed Dec. 17, 2007, Hayashi.
U.S. Appl. No. 11/952,875, filed Dec. 7, 2007, Davis.
U.S. Appl. No. 11/960,368, filed Dec. 19, 2007, Madsen.
U.S. Appl. No. 11/952,007, filed Dec. 6, 2007, Davis.
U.S. Appl. No. 11/953,454, filed Dec. 10, 2007, Davis.
U.S. Appl. No. 11/953,494, filed Dec. 10, 2007, Davis.
U.S. Appl. No. 12/059,594, filed Mar. 31, 2008, Martinez.
U.S. Appl. No. 12/236,668, filed Sep. 24, 2008, Davis.
U.S. Appl. No. 12/057,943, filed Mar. 28, 2008, Martinez.
U.S. Appl. No. 12/057,878, filed Mar. 28, 2008, Martinez.
U.S. Appl. No. 11/969,751, filed Jan. 4, 2008, Martinez.
U.S. Appl. No. 12/163,249, filed Jun. 27, 2008, Kalaboukis.
U.S. Appl. No. 12/145,145, filed Jun. 24, 2008, Davis.
U.S. Appl. No. 12/182,813, filed Jul. 30, 2008, Higgins.
U.S. Appl. No. 12/182,969, filed Jun. 27, 2008, Higgins.
U.S. Appl. No. 12/163,314, filed Jun. 27, 2008, Higgins.
U.S. Appl. No. 12/163,396, filed Jun. 27, 2008, Higgins.
U.S. Appl. No. 12/195,969, filed Aug. 21, 2008, Martinez.
U.S. Appl. No. 12/234,000, filed Sep. 19, 2008, Martinez.
U.S. Appl. No. 12/241,687, filed Sep. 30, 2008, Davis.
U.S. Appl. No. 12/206,172, filed Sep. 8, 3008, Higgins.
U.S. Appl. No. 12/273,291, filed Nov. 19, 2008, Nair.
U.S. Appl. No. 12/273,317, filed Nov. 18, 2008, Nair.
U.S. Appl. No. 12/273,345, filed Nov. 18, 2008, Nair.
U.S. Appl. No. 12/273,371, filed Nov. 18, 2008, Nair.
U.S. Appl. No. 12/241,198, filed Sep. 30, 2008, Higgins.
U.S. Appl. No. 12/339,355, filed Dec. 19, 2008, Higgins.
U.S. Appl. No. 12/329,038, filed Dec. 5, 2008, Higgins.
U.S. Appl. No. 12/326,553, filed Dec. 2, 2008, Churchill.
U.S. Appl. No. 12/242,656, filed Sep. 30, 2008, Burgener.
U.S. Appl. No. 12/357,311, filed Jan. 21, 2009, Higgins.
U.S. Appl. No. 12/357,332, filed Jan. 21, 2009, Higgins.
U.S. Appl. No. 12/357,345, Jan. 21, 2009, Higgins.
U.S. Appl. No. 12/357,285, filed Jan. 21, 2009, Higgins.

* cited by examiner

METHOD AND APPARATUS FOR SOCIAL NETWORK MARKETING WITH CONSUMER REFERRAL

TECHNICAL FIELD

The present disclosure relates generally to an online marketing system with personalized advocacy for branded consumables.

BACKGROUND

The Internet has become a marketplace for goods and services offering wide selection at low prices. Despite these advantages, some consumers prefer the personalized experience of in-person sales and retain loyalty to so-called "brick and mortar" stores. Retailers, service providers, and advertisers seek improved means of marketing goods over the Internet.

Research has shown that some consumers prefer, and are more likely to be influenced by, marketing efforts provided by access to persons familiar with the marketed goods, brands, or services. In a brick and mortar store, consumers prefer retailers who provide individualized service, trustworthy knowledge, superior support, and easy access to quality goods. Some consumers prefer the social experience of personal interaction. Consumers are also heavily influenced by the consumption preferences of their social peers.

Perhaps the most powerful kind of advertising is so-called "word-of-mouth" advertising. In typical word-of-mouth advertising, a potential consumer is influenced by a product advocate socially connected to the consumer. The advocacy is a valuable service to the product supplier or advertiser. At this time, there is no simple way to assess the value of this advocacy and no infrastructure to support product advocacy, provide consumer-advocate-brand matching services, and provide advocacy incentives. Further, at this time no means exist for the consumable advertiser or supplier to compensate the network operator for facilitating communications between consumers and consumption advocates.

SUMMARY

A service provider facilitates consumption of goods, brands, or services on an interactive network by characterizing consumers, consumption behavior, brands, consumables, advertisers, and advocates to determine a three-way match between a consumable good, a consumer, and an advocate. The matching method inputs two out of three parties to the match, a consumable good and an advocate, and determines one or more likely consumers by maximizing the estimated contextual value of personalized advocacy. Further, the service provider captures the value of the personalized advocacy in each match, and distributes that value in the form of various marketing incentives.

DETAILED DESCRIPTION

Figure 1:
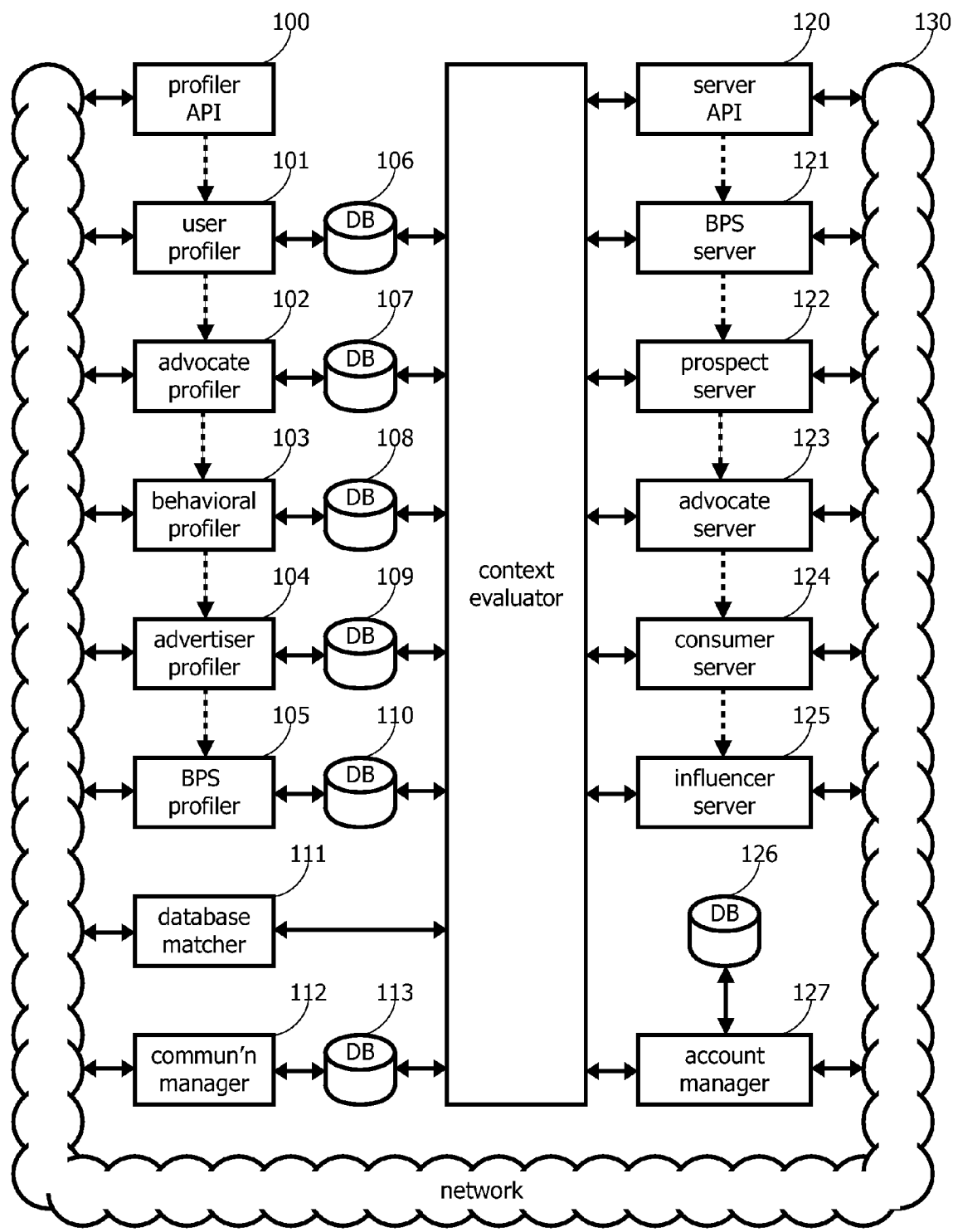
FIG. 1 is a block diagram of an example backbone apparatus.

A possible use of the present invention is to computationally capture, support and monetize word-of-mouth advertising, providing sponsors a way to utilize personalized advocates to deliver authentic marketing messages to prospective consumers. In particular, this invention focuses on a system to manage and locate product consumers in personalized marketing campaigns on interactive networks.

Network users typically operate a physical device, such as a telephone, a text messenger, a cell phone, a smart phone, a personal digital assistant, a networked music/video player, a personal computer, or a public terminal, to access marketing information on the Internet, utilizing a number of application programs to consume network content. The Internet consumer is typically able to access a plethora of information available online. The digital information consumer perceives information conveyed over the network through various forms of media objects, including text, icons, voice, avatars, audio recordings, pictures, animations, videos, interactive widgets, and other audiovisual information.

The source code for a media object or a web page may contain metadata and one or more instances of script languages. ECMAScript is a script programming language, standardized by ECMA International of Geneva, Switzerland, in the ECMA-262 specification. JavaScript and Jscript are the most common implementations of the EMCAScript standard. "JavaScript" is a registered trademark of Sun Microsystems, Inc. of Santa Clara, Calif.; technology is further developed and implemented under license by the Mozilla Foundation of Mountain View, Calif. "JScript" is an ECMAScript implementation from Microsoft Corporation of Redmond, Wash. JavaScript and Jscript are often used for client-side interactive web applications.

When a consumer accesses a web page, script functions can interact with the Document Object Model (DOM) of the web page to perform one or more tasks. Scripts may also be used to make service requests to remote servers after a page has loaded. These requests can obtain new information or data, as well as load or launch additional applications, e.g., media object players, content viewers, application plug-ins, or software codes. Script code can merge with the DOM of the underlying page so that one or more additional media objects are displayed or otherwise rendered on the page. Alternatively, the script code may initiate one or more additional pages or other rendering for the additional media object(s). When script code is embedded into an HTML document and subsequently accessed by a client application, the client application may retrieve and execute the script. The script may initiate service requests to one or more remote servers to retrieve and render one or more media objects that enhance the underlying content of the page, optionally using parameter values assigned in the embedded code. For example, the script, when executed, may access stored locally stored user preferences or user attributes stored in relation to the use of browser "cookies" and contain one or more user attributes in a dynamically generated service request.

The invention described herein is a backbone marketing system to support enhanced consumer access to marketing information, preferably provided by social peers of the consumer. The following embodiments and aspects thereof are described and illustrated in conjunction with systems, apparatuses and methods meant to be exemplary and illustrative, not limiting in scope.

The following description sets forth numerous details to provide a thorough understanding of various aspects of the present invention. It will be apparent to those skilled in the art, however, that the present invention may be practiced without these specific details. In other instances, algorithms for processing data and symbolic representations of algorithmic operations are the means used by those skilled in the art to most effectively convey the substance of their work to others skilled in the art. An algorithm, as used herein, is a sequence of operations leading to a desired result, said operations requiring physical manipulations of physical quantities. Usually, though not necessarily, these quantities take the form of a sequence of electrical signals representing binary numbers to be stored, transferred, combined, compared, and otherwise manipulated.

The present invention also relates to apparatus for performing the operations herein. This apparatus may be specially constructed for the required purposes, or it may comprise one or more general-purpose computers selectively activated by one or more computer programs to achieve the required results. Such a computer program may be stored in any suitable computer-readable storage medium. A computer-readable storage medium includes any mechanism for storing or transmitting information in a form that is usable by a machine, such as a general-purpose computer.

The algorithms and displays presented herein are not inherently related to any particular computer or other apparatus. Various general-purpose systems may be used in accordance with the teachings herein, and it may prove expedient to construct more specialized apparatus to perform the algorithm operations. The required structure for a variety of these systems may appear from the description below. In addition, the present invention is not described with reference to any particular programming language. Those skilled in the art will appreciate that a variety of programming languages may be used to implement the teachings of the invention as described herein.

The specification sets the framework by first describing a block diagram of a PeopleMatch backbone system, which operates to identify best matches between a consumer, a branded consumable, and an advocate. Second, examples of matching algorithms employed are described. In each match, various prospective consumers are considered and their marketing value is estimated in a context dependent manner to determine best matches. Various example marketing and matching contexts are described. Third, a set of one or more best prospects is utilized in a marketing campaign, where the actual value of advocacy is determined and distributed. A portion of the distributed value provides various marketing incentives to expand the PeopleMatch marketing system. Fourth, an alternative embodiment demonstrates an adaptive matching algorithm based on primitive attributes.

A. System Backbone Apparatus

FIG. 1 is a block diagram of an example backbone system. Various profiling functions are performed by elements 101-105, including a user profiler 101, an advocate profiler 102, a behavioral profiler 103, an advertiser/publisher profiler 104, and a consumable brand, product, or service (BPS) profiler 105. The various profilers may be accessed directly through service requests over network 130, or may be accessed indirectly trough a profiler Application Programming Interface (API) 100. The profiler API 100 may be used to modify or access the functionality of any of the profilers 101-105. A possible use of the system is to provide network servers for matching services. Various matching functions are performed by host servers 121-125, which include a BPS server 121, a prospect server 122, an advocate server 123, a consumer server 124, and an influencer server 125. A server API 120 may be used to access or modify the functionality of any of the third party servers 121-125.

A1. User Profiling

In the system, it is convenient to think of the typical user as a potential consumer of a brand, product, service, or other consumable, but as described further below, a user may also qualify as an advocate or as an expert, as discussed further below. Although the system may be used anonymously, in a preferred embodiment a user has a profile of various explicitly defined or implicitly derived attributes, including one or more attributes related to social interaction and consuming habits. In one embodiment, the user registers and optionally completes an explicit user profile at registration. In another embodiment, user profiles are obtained from an external service provider. In an alternate or further embodiment, user attributes are supplied in a backbone service request, such as by passing a user cookie as described above. In an alternate or additional embodiment, user attributes are learned through online activity. Attributes of users learned in network use are further tracked in user profiler 101, stored in a database of user profiles 106, and in one embodiment, adaptively modified as described further below.

A user profile in database 106 includes user attributes and one or more ratings related to a user's social preferences, such as user demographic groups, social connections, and relative ratings associated with the various attributes. In one embodiment, an attribute rating is on a scale from negative one to positive one, with a positive one denoting that the rating holder is perfectly aligned with the attribute, and a negative one denoting that the rating holder is perfectly misaligned with the attribute. To illustrate, an example attribute may be "male buying habits." A user who completely fit the pattern associated with the attribute would have an associated rating of positive one, while a user who completely fit the opposite pattern ("female buying habits") would have a "male buying habit" rating of negative one. Users who displayed a mix of male and female buying habits would be rated somewhere between negative and positive one.

A user profile may also include one or more rated attributes of consumption interest in a brand, product, or service (BPS), rated attributes of existing relationship(s) with a BPS and rated knowledge about a BPS. A user profile may also include one or more means of communicating with the user, and, with more than one means, a relative priority of means of communication. In one embodiment, the user profile is partitioned into social, temporal, spatial, and semantic ratings. In one embodiment, a user profile contains one or more personalized user consumption ratings. In a preferred embodiment, each user is assigned a unique identifier to be associated with access to the various user attributes in database 106.

A2. Group Profiling

In a further embodiment, one or more groups of users with one or more common attributes may be formed. A user's attributes may include the identification of the user's groups and, for each such group, a rating of the user's alignment with the group. For example, two user groups might be "males" and "females". Further, two or more user groups may be hierarchically organized in a progression from personal association to local group association to global association. To illustrate, a user may be geographically classified in various groups, including a city group, a county group, a state group, a country group, a continent group, and the entire group of users. In one embodiment, the user has an associated rating for the one or more geographic groups. The ratings may be further characterized as personal ratings, local ratings, or global ratings. For example, a user may be a citizen of Oakland in the state of California in the United States. A user rating may be decomposed into the global view of users who are United States citizens, modified by the more localized view of users who are Californians, further influenced by the local view of users who are citizens of Oakland, and refined by the personal alignment of the user. In one embodiment, the averaged statistical response of each group in various contexts is tabulated and stored as a rating in the user database 106, and one or more ratings associated with a group are determined adaptively as described further below. For example, the consumption habits of the group of users in a "male group" may be statistically analyzed to determine average group consumption habits.

A3. Advocate Profiling

In the system, advocates are a pre-qualified and monitored subset of users. As used herein, advocates may be further classified into two or more categories. The advocate categories include non-monetary incentive advocates and monetary incentive experts. Further, some advocates are further qualified as experts. As mentioned above, a user may optionally choose to participate and may be further qualified as an advocate for a BPS by the marketing system. In one embodiment, general BPS advocates are motivated with non-monetary incentives related to the value of their advocacy. In a further embodiment, a user may optionally choose to participate and may be further qualified as an expert advocate for a BPS. In one embodiment, expert BPS advocates are further motivated with monetary incentives related to the value of their advocacy.

In a preferred embodiment, an advocate has a profile of various explicitly defined or implicitly derived attributes, including one or more attributes related to social interaction and advocacy skills. Attributes of advocates learned in use of the network or system are further tracked in advocate profiler 102, stored in a database of advocate profiles 107, and, in one embodiment, adaptively modified as described below. In a preferred embodiment, each advocate is assigned a unique identifier used to access the advocate attributes in database 107.

In a further embodiment, feedback from consumer actions, external product suppliers, advertisers and/or other marketers is also adaptively used to modify advocate profiles. An advocate profile may also include one or more personal attributes, such as advocate demographics, advocate social connections, a set of user groups for the advocate, and relative alignment and popularity ratings associated with different demographic groups. An advocate profile may also include one or more rated attributes of an existing relationship or connection to a brand, product, or service (BPS) and one or rated attributes related to knowledge about a BPS. In one embodiment, the advocate database 107 includes one or more attributes indicating means of communicating with the advocate and/or one or more communication availability status indicators.

In one embodiment, an advocate profile contains one or more types of advocate marketing scores. In a further embodiment, advocates are sub-divided into a number of advocate classification types. For example, a user who purchases a product may be qualified as a product-consumer advocate, while a user who meets a higher product supplier's criterion may be qualified as a brand advocate. A set of advocate classification types may also include one or more categories of experts. Experts may be further classified as paid experts, incentive experts, or self-motivated experts. A paid expert may be, for example, a manufacturer's representative. An incentive expert is motivated to act to realize certain non-monetary incentives, as described further below. A self-motivated expert does not receive tangible incentives, but may receive intangible incentives such as an improved advocacy rating. Each type of advocate may have its own standard of qualification and means of updating advocate ratings applied by advocate profiler 102.

A4. Brand Profiling

A database of consumable goods 110 is determined and updated by BPS profiler 105. A consumable good is typically a product, brand, or service, but could be anything that can be marketed, including a reference to further marketing materials, such as a manufacturer's website. The system characterizes and stores one or more attributes of a consumable BPS, such as a characterization of a BPS's typical buying cycle, a BPS's competing products, demographics of the average BPS consumer, BPS marketing goals, and so on.

A5. Behavioral Profiling

Figure 2:
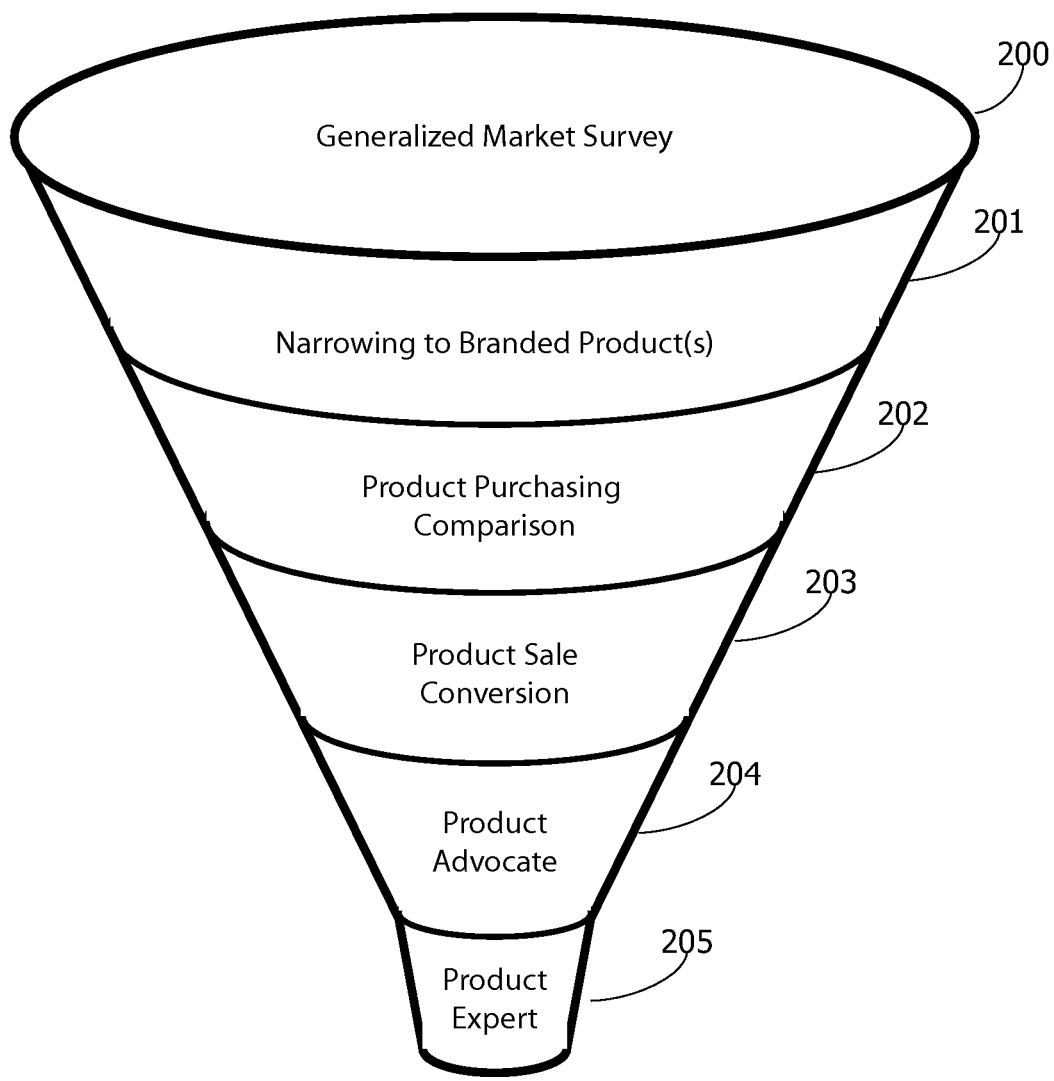
FIG. 2 shows a typical consumer-to-advocate funnel.

An example buying cycle for a hypothetical product is depicted as a funnel in FIG. 2. A favorable buying cycle for this product may contain various identifiable phases, typically progressing from the general to the specific. In this example, the number of phases from first inquiry to sale is illustrated as four, but this is for illustration purposes only and not by way of limitation. The actual number of identifiable phases may be smaller or larger for a particular consumable good. Further, one or more of the identified phases may be further subdivided or combined with another identified phase. In this example, the consumer is acquiring information about available products in a generalized market survey 200, narrowing to acquisition of marketing materials for a few competing products 201, comparison-shopping to focus on one or more specific branded products 202, and purchasing in a product sale 203. A consumer may further opt-in to become a product advocate 204, and finally, to become a product expert 205. As mentioned above, the categories of advocate and/or expert may be further subdivided and characterized. For example, a consumer who favors a purchased product may qualify as a "product-using advocate", while a consumer who also displays knowledge about competing products may qualify as a "product-comparison advocate".

The behavioral profiler may be considered as combining known members of the set of {who, what, where, how, when} related to a potential consumption to assess consumer interests, the probability of consumption and, in the case of a purchase, the location in a buying timeline. In a typical evaluation, a known user is a prospect who would consume, influenced by socially related persons who would advocate consumption. A product, brand, or service is what the consumer would prospectively consume, as well as marketing messages for the BPS. The best advocate, marketing message, or product depends in part on where the consumer is, both in terms of physical location of the user or request, as well as in terms of network location, such as the current web page, domain, network, or service provider, and includes device specifics such as display device, communication device, and so on. The behavioral profiler 103 estimates how the purchase is to be made, as well as how best to approach the consumer. The behavioral profiler 103 also analyzes browsing requests to estimate when the purchase is to be made in an estimated user-modified product-buying cycle. By monitoring various browsing and other online activities of the user in behavioral profiler 103 and adaptively modifying behavioral database 108, future consumption habits of the consumer may be predicted, particularly as the consumer approaches a major purchase. Results from the behavioral profiler 103 are stored in database 108.

At each phase of the typical funneling behavior, the breadth of consumer inquiries is diminished, the consumer shifts focus from the more general to the more specific, and fewer consumers qualify for progression in the cycle, narrowing to a smaller stream. Note that the typical buying cycle for a long-term asset, such as an automobile, is very different than the buying cycle for a short-term convenience like an automatic can opener. In one embodiment, the behavioral profiler accounts for these differences by dividing BPSs into categories, and characterizes the various phases of the buying cycle in each category and marketing context.

A6. Product, Brand, or Service Specific Profiling

The BPS profiler 105 inputs or learns characterizations of the different buying phases for each general and specific type of a BPS, and stores characterization of various buying cycles indexed by BPS identifier in database 110. In one embodiment, similar products are grouped together in categories, such as example category "auto insurance." Alternatively, a characterization of product buying cycles for various products or categories is obtained from a third party. Further, an individual consumer may have individualized buying habits, stored in database 106, that differ from the typical buying cycle. Consumer actions are monitored and assessed in comparison with various consumption phase patterns to predict the location in a buying cycle in behavioral profiler 103. In one embodiment, the behavioral profiler 103 further modifies the purchasing timeframe estimation using the output of the BPS profiler 105 and the user profiler 101 to combine the consumer's personalized buying habits stored in 106, a BPS's typical buying cycle stored in 110, and detected consumer actions stored in 108 to refine the prediction of the consumer's purchasing intentions and timeframe.

A7. Advertiser and Publisher Profiling

Advertisers or marketers ultimately seek to identify consumers heading toward a purchase, and to steer the consumer to an advertised product. However, the interim marketing goals of an advertiser can vary considerably, and different advertisers with differing marketing materials and methods are willing to pay differing rates for realization of differing goals. One or more attributes of an advertiser and advertising campaign are determined in advertiser profiler 104 and stored in database 109. In one embodiment, a measure of the fulfillment of each marketing goal is also stored in database 109. In one embodiment, marketing messages are also stored in database 109. Alternatively, a measure of the fulfillment of each marketing goal may be determined or maintained in account manager 127 or obtained from advertisers, suppliers, or external accounting service providers, and stored in database 126. In one embodiment, advertiser profiler 104 may also determine one or more relative priorities of advertisers to be stored in advertiser profile database 109. In one embodiment, an advertiser profile also contains one or more ratings of current network conditions, such as monetization goals, content obligations, network traffic conditions or trends, and a desired user experience.

Attributes of publishers may also affect the selection of appropriate consumers, products, advocates, experts, and marketing materials. Typically, an advertiser targets certain publications, and attributes of potential publishers may be stored in advertiser profile database 109. Alternatively, a publisher profiler (not shown) characterizes and updates attributes of publishers stored in a publisher database (not shown). A publisher database may contain one or more attributes related to publisher obligations, fulfillment of publisher goals, publisher marketing materials, publisher network conditions, qualified publisher advocates and experts, and so on.

A8. Database Matching

In various embodiments, a search is performed to determine a set of best three-way matches made between a BPS, a consumer, and an advocate. The best matches are determined by searching one or more databases to determine profiles with favorably weighted attributes. In one embodiment, database matcher 111 receives a service request including one or more weighting functions and an identification of one or more databases to search from context evaluator 114. In response, database matcher 111 determines and provides identification of the best matches.

A9. Communication Manager

In various embodiments, direct "one-click" communication between a consumer and an advocate often results in the most successful three-way marketing match. In an example embodiment, a representation of an advocate is displayed in proximity to a marketing message on a web page. By using a computer's pointing device, such as a computer mouse, an interested consumer is able to move a screen cursor to position it over the representation of the advocate. In one embodiment, the representation of the advocate is instrumented to provide that a single click of the mouse button initiates communication between the consumer and the advocate as facilitated by communication manager 112. In a further embodiment, communication manager 112 accesses the database of user profilers 106 and the database of advocate profiles 107 to determine a default or preferred means of communication suitable to both parties. In a typical implementation, a default means of communication is by Voice over Internet Protocol (VoIP), but communication may be established through any convenient means, including one or more of communication by instant messaging, text instant messaging, audio-visual instant messaging, direct phone dialing, the Short Message Service (SMS) protocol, or e-mail communication. In a preferred embodiment, the communications manager allows each party to retain communication anonymity if desired. Communications activity and consumption activity completed through such communications are logged in database 113.

A10. Account Manager

The system is designed to facilitate marketing and consumption of products. Account manager 127 tracks matching and marketing activity and associated consumption activity, and stores logs of the activities in database 126. In one embodiment, the account manager further determines the enhanced value of marketing with supplied advocacy as described further below. In a further embodiment, the account manager updates client accounts, bills various system customers, maintains various account receivables, and determines distribution of a revenue stream. In one embodiment, a portion of the receivables stream is dedicated to providing various marketing incentives, including payments for experts and non-monetary incentives for advocates, as described further below.

A11. Server API

As indicated above, the marketing system provides one or more three-way matches between a consumer, a brand, product, or service (BPS), and an advocate. In a typical use of the system, two of the three parties to a three-way match are provided, and a marketing system server provides the identification of one or more third parties. In one embodiment, the third party may be obtained through the server Application Programming Interface (API) 120. The server API 100 may be used to access of modify the functionality of any of the third party servers 121-125, including one or more of the BPS server 121, the prospect server 122, the advocate server 123, the consumer server 124, and the influencer server 125.

A12. BPS Server

The BPS server is used to search for and access one or more attributes of a consumable good, such as a marketed brand, product, or service (BPS). In a typical use of the BPS server 121, the identification of a pair of users is provided in a service request, and the BPS server 121 responds with the identification of one or more brands, products, or services likely to benefit from marketing with personalized advocacy. As mentioned above, a consumer may be qualified as an advocate or further qualified as an expert with regard to a specific BPS. In order to make a successful match, at least one of the users must be qualified as a BPS advocate or expert.

When each user is qualified to act as an advocate for one or more products, the question arises as to which user should be regarded as the advocate and which should be regarded as the consumer. In one embodiment, a service request to the BPS server includes an identification of the user to be regarded as the advocate, and a search is performed among all brands, products, and services qualified for advocacy by said user to find the BPS likely to provide the greatest marketing benefit with regard to the other consuming user. In an alternate or augmented embodiment, each user is regarded as a potential advocate, and a search is performed among all qualified brands, products, and services for either user as advocate to find the BPS likely to provide the greatest marketing benefit to the other consuming user. In the alternate embodiment, a service request response identifies the BPS and the user to be considered the advocate.

With each prospective match of a consumer, advocate, and BPS, an estimate of the match value is determined using the context evaluator 114, the database matcher 111, and the various databases 106-110, 113, and 126, as discussed further below. The match values associated with various matches are sorted, and one or more matches with the highest match values are considered the best.

A13. Advocate Server

The advocate server is used to search for and access one or more attributes of a marketing advocate. In a typical use of the advocate server 123, the identification of a consumer and a BPS is provided in a service request, and the advocate server 123 responds by providing the identification of one or more advocates likely to successfully promote consumption of the BPS. With each prospective match of a consumer, advocate, and BPS, an estimate of the match value is determined using the context evaluator 114, the database matcher 111, and the various databases 106-110, 113, and 126, as discussed further below. The match values associated with various matches are sorted, and one or more matches with the highest match values are considered the best.

A14. Consumer Server

The consumer server is used to search for and access one or more attributes of consumers. In a typical use of the consumer server 124, the identification of an advocate and a BPS is provided in a service request, and the consumer server 124 responds by providing the identification of one or more consumers likely to be motivated by personalized advocacy of the BPS. With each prospective match of a consumer, advocate, and BPS, an estimate of the match value is determined using the context evaluator 114, the database matcher 111, and the various databases 106-110, 113, and 126, as discussed further below. The match values associated with various matches are sorted, and one or more matches with the highest match values are considered the best.

A15. Prospect Server

In a typical use of the prospect server 124, the identification of an advocate and a BPS is provided in a service request, and the prospect server 124 responds by providing the identification of one or more users likely to be motivated to consider consumption of the BPS. With each match of a prospect, advocate, and BPS, an estimate of the match value is determined. The match values associated with various matches are sorted, and one or more matches with the highest match values are considered the best.

A16. Influencer Server

In a typical use of the influencer server 125, the identification of a BPS is provided in a service request, and the influencer server 125 responds by providing the identification of one or more groups of users likely to be motivated to consider consumption of the BPS, and for each group, one or more advocates likely to influence the group. With each prospective match of a group, advocate, and BPS, an estimate of the match value is determined. The match values associated with various matches are sorted, and one or more matches with the highest match values are considered the best.

In the context of a computer network terminology, a server is sometimes referred to as a virtual server. A virtual server is physically one or more server systems connected to the network and support circuitry to execute application programs for processing data. Data may be stored by means which facilitate efficient processing, such as by storing the data in a "database" consisting of a collection of data organized by relationships between the various forms of data contained therein. When a virtual server consists of more than one computer server system, the set of computer server systems is interconnected hierarchically to perform high-level functions as combined functions of several servers under central control.

Functionally, a virtual server executes a sequence of low-level CPU commands to complete instructions for processing data. A virtual server typically accepts instructions and executes commands for a multitude of "clients". The instructions may include, but are not limited to, instructions to store or retrieve data, to modify, verify or erase data, or to reorganize data. A virtual server may also initiate instructions for other network-attached devices. For example, a virtual "music server" might maintain a database to locate a library of musical compositions. The music server might receive commands to store new songs or retrieve old ones from a number of clients. Further, the music server might send commands to other devices on the network, e.g., to disseminate the musical database among various subservient servers, such as a "jazz server," a "hip-hop server," a "classical server," and so on, to register paying user requests in a "billing server," to verify the identity, preferences, and access privileges of a user in a "registration server" and so on. The music server may therefore also be a client of other servers. Practitioners of the art will recognize that virtual servers and clients are abstract interactive devices controlled by software instructions, whose interaction protocols may be flexibly defined. A "client" as used herein may include functionally to process information and programs, as well as to issue commands. Similarly, a virtual server as used herein may include functionally to initiate commands to users and other servers as well as to respond to instructions.

Similarly, a database should not be construed to be a single physical collection of data. As used herein, a database is an abstract collection of data and may be distributed over one or more physical locations. Said data may be stored physically within a single or multiple servers, within attached physical device(s), network attached device(s), or user devices(s). Similarly, an application program should not be construed to be a single physical collection of commands. As used herein, an application program is an abstract collection of CPU commands, which may be physically executed, in whole or in part, within a single or multiple servers, within attached physical devices(s), within network attached device(s), or within user device(s).

B. Contextual Matching

Figure 3:
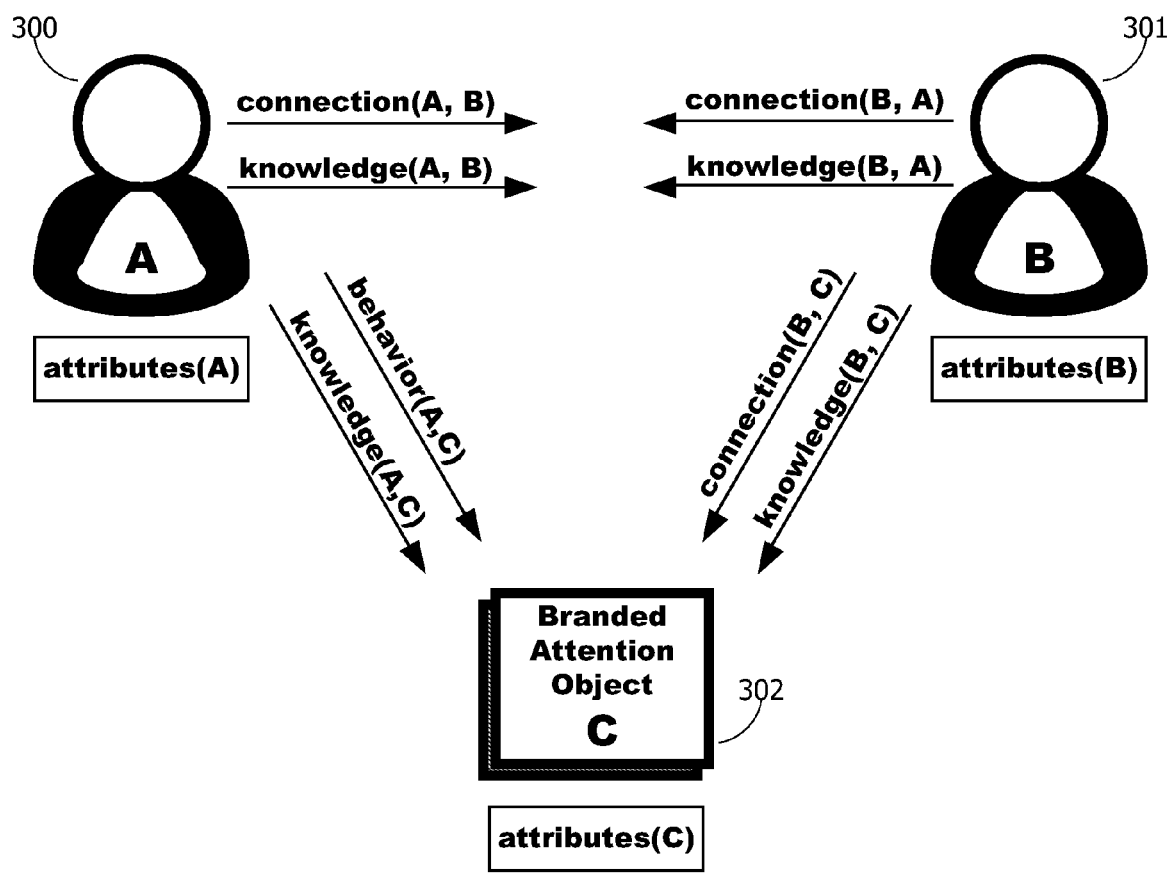
FIG. 3 shows a three-way match.

FIG. 3 depicts a prospective three-way match between a user 300, denoted user A, a second user 301 acting as an advocate, denoted user B, advocate B, or expert B, and a consumable, denoted BPS C. In a typical environment, the consumable is a brand, product, or service drawn to the attention of user A. Each of the three parties of the match possesses a set of attributes, said sets denoted attributes(A), attributes (B), and attributes(C), and stored in databases 106, 107, and 110, respectively. Some or all of the attributes may be explicitly defined, while some attributes may be implicitly or probabilistically determined.

In a preferred implementation, the matching system operates by estimating a set of essential quantities reflecting pairwise relationships in the three-way match. For example, in a preferred embodiment, user A and advocate B have a social relationship based on some commonality of experience, interests, and values. The social relationship may be characterized as having an objective or factual component, denoted "knowledge" in FIG. 3, and a subjective or emotional component denoted "connection." To signify that the example relationship may not be reflexive, user A's knowledge of advocate B is denoted knowledge(A, B), while advocate B's knowledge of user A is denoted knowledge(B, A). Similarly, user A's connection to advocate B is denoted connection(A, B), while advocate B's connection to user A is denoted connection(B, A), and so on. The estimated essential quantities are further combined in a context-dependent manner to determine an overall match score or match value.

To estimate the strength of the social relationship between A and B, a social strength function combines the essential estimated quantities. In a preferred implementation, the essential social strength quantities include an estimate of social knowledge and social connection. In one implementation, each essential quantity is rated on a scale from negative one to positive one, assigned a weighting factor on a scale from negative one to positive one, and the social strength is determined as a weighted sum of the product of the rated factors. In a preferred embodiment, a set of weighting factors for each context, combining a marketing context and a phase of a buying cycle, is determined and stored. For example, in a generalized market survey, a consumer typically gives greater weight to fact gathering, whereas in a potential sales closing with an advocate, the consumer typically gives greater weight to intangible emotional aspects of the relationship with the advocate, such as trust in the advocate. This change in consumer focus is reflected by using a set of weighting factors giving greater weight to knowledge in an early buying cycle, and greater weight to connection in a later buying cycle.

In an alternate embodiment, each of the attributes of A and B are quantized. Attributes are then partitioned into groups affecting essential estimated quantities. For example, a social strength may be further characterized as having two components, attributes reflecting potential common knowledge and attributes reflecting potential common connection. By correlating the common knowledge attributes of A and B, a common knowledge score is computed. By correlating the common connection attributes of A and B, a common connection score is computed. The social strength is computed by combining the component scores. In one implementation, the social strength is a sum of component scores. In an alternate implementation, the essential estimated quantities are thought of as occupying orthogonal dimensions, and the social strength is a Euclidean distance (or "L2 norm") calculated as a sum of squares of orthogonal essential estimated quantity scores.

In a preferred embodiment, the attributes of A and B are combined using a combination of weighting factors, differences, squared distances, and correlation. Attributes are quantized and partitioned into groups affecting essential estimated quantities. Generally, user A and advocate B have more in common when they have highly correlated attributes. A weighting factor may be used to ignore or negatively weigh an undesired attribute. However, in some marketing efforts, it may be desired that the user A and the advocate B have some attributes with a large difference in quantized value, such as those characterizing product knowledge. For example, in a generalized market survey phase of a buying cycle, it may be desired that the advocate have a much greater knowledge of the BPS than the user, whereas a knowledgeable consumer about to make a purchase may prefer an advocate with similar knowledge of the product. An example knowledge score (Ks) for the early buying cycle phase is $$Ks = \text{knowledge}(B,C) - \text{knowledge}(A,C).$$

If the only significance is the magnitude of difference in knowledge, an example knowledge score is $$Ks = \{\text{knowledge}(B,C) - \text{knowledge}(A,C)\}^2.$$

An example knowledge score for the later buying cycle phase is $$Ks = \text{knowledge}(B,C) * \text{knowledge}(A,C).$$

Further, as mentioned above, the scores are weighted to account for marketing context. In one embodiment, a marketing contact is classified as a direct contact or an indirect contact. For example, a consumer may access marketing material consisting of a banner advertisement for a product motorcycle. The banner ad may be accompanied by an instrumented representation of an advocate, which provides a direct communication contact to the represented advocate. Alternatively, the banner ad may be accompanied by a link to request an indirect contact to an advocate. When the context categories include one or more means of direct contact, an advocate profile includes one or more attributes related to the expected marketing value of the advocate in a direct contact context. Direct and indirect marketing contacts may be further classified and advocate attributes may be correspondingly expanded to account for differing responses in consumer-initiated contact and system-assisted contact.

In an alternate or augmented embodiment, a marketing contact is classified as explicit, implicit, or probabilistic. For example, the banner ad may be accompanied by a single explicit advocate reference, such as a representation of a specific named advocate. Alternatively, the banner ad may be accompanied by a single implicit advocate reference, such as the representation of an otherwise anonymous advocate labeled "Service Technician." When the context categories include one or more means of explicit (implicit) contact, an advocate profile includes one or more attributes related to the expected marketing value of the advocate in an explicit (implicit) context. An example of a probabilistic contact is a banner ad accompanied by two or more representations of competing advocates, any of which may be selected by the consumer. The expected marketing value of an individual advocate is a product of (a) the probability that the advocate is selected by the consumer and (b) the conditional expected marketing value of the advocate if selected. When the context categories include one or more means of probabilistic contact, an advocate profile includes one or more attributes related to the expected marketing value of the advocate in the probabilistic context.

Figure 4:
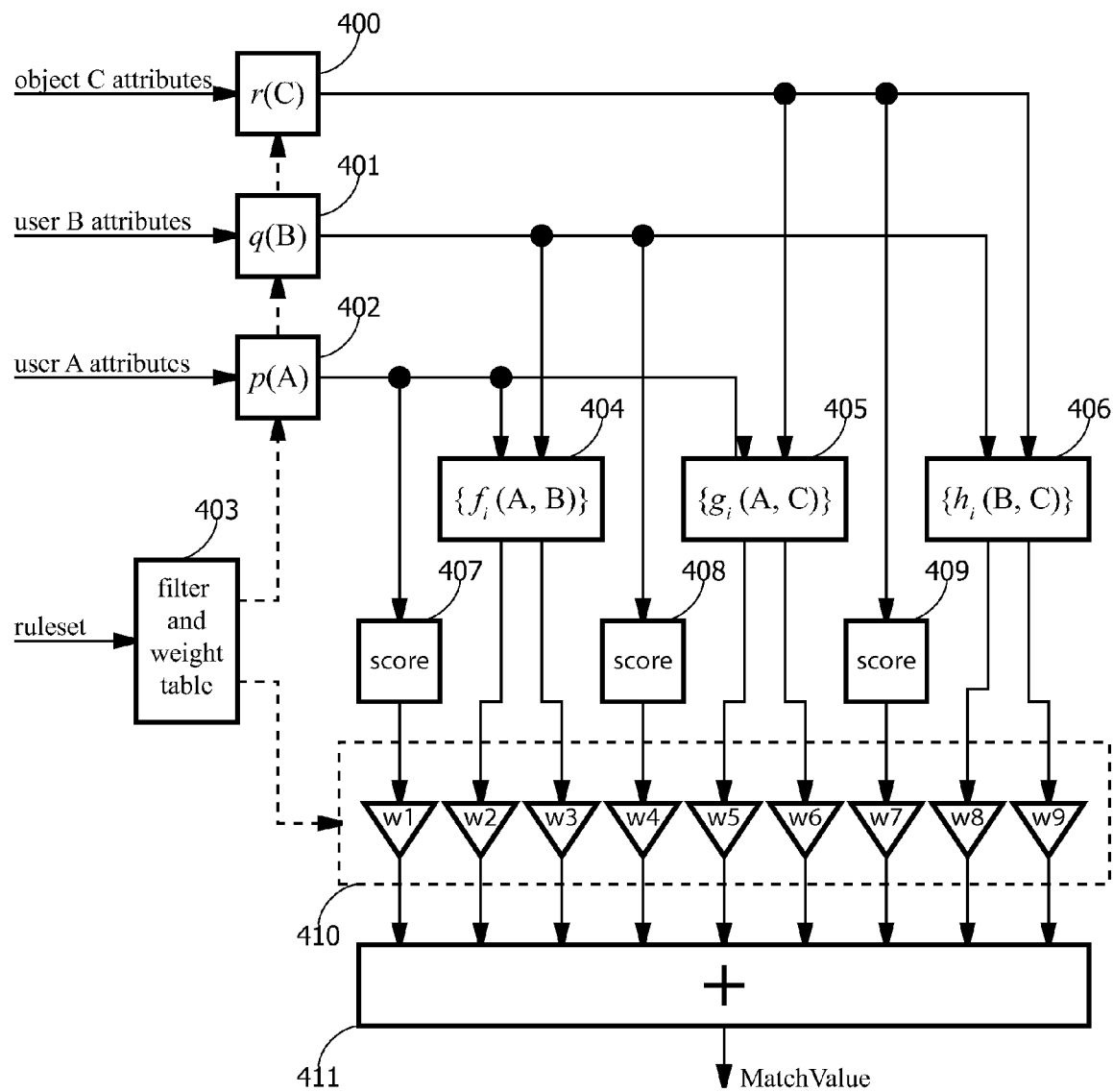
FIG. 4 shows an example matching value estimator.

FIG. 4 illustrates an example matching value estimator. In FIG. 4, the inputs are attributes of user A, user B, and BPS C, and a RuleSet identifier for the context of the marketing campaign and the phase of the buying cycle. The RuleSet identifier indexes a table 403 of filter rules and score combining weights. The filter rules control filters p(A), q(B), and r(C). In one implementation, filter r(C) scales and quantizes attributes of BPS C to determine which are quantized positively, which are quantized negatively, and which are ignored at the output of filter r(C). Similarly, filter q(B) determines the weighting of advocate B's attributes, and filter p(A) determines the weighting of user A's attributes. User A's attributes are combined in score unit 407, advocate B's attributes are combined in score unit 408, and BPS C's attributes are combined in score unit 409.

Unit 404 evaluates the essential estimated quantities of the pair-wise relationship between user A and advocate B. Two or more essential quantities are estimated, denoted $$\{f_i(A,B)\}$$

where the essential quantity index i equals 1, 2, and so on. The two or more essential quantities included social knowledge score and social connection score.

Unit 405 evaluates the essential estimated quantities of the pair-wise relationship between user A and BPS C. Two or more essential quantities are estimated, denoted $$\{g_i(A,B)\}$$

where the essential quantity index i equals 1, 2, and so on. The two or more essential quantities include product knowledge score and product purchasing behavior score.

Unit 406 evaluates the essential estimated quantities of the pair-wise relationship between advocate B and BPS C. Two or more essential quantities are estimated, denoted $$\{h_i(A,B)\}$$

where the essential quantity index i equals 1, 2, and so on. The two or more essential quantities include product knowledge score and product connection score.

The various scores at the outputs of scoring units 407-409 and pair-wise evaluator units 404-406 are multiplied by weighting factors denoted w1-w9 in scaling unit 410. The weighting factors are obtained from table 403 in response to an identified RuleSet. The weighted scores are combined in adder 411 to create a MatchValue output, where a greater MatchValue output indicates a three-way match with a greater expected marketing value.

C. Consumer Matching

Figure 5:
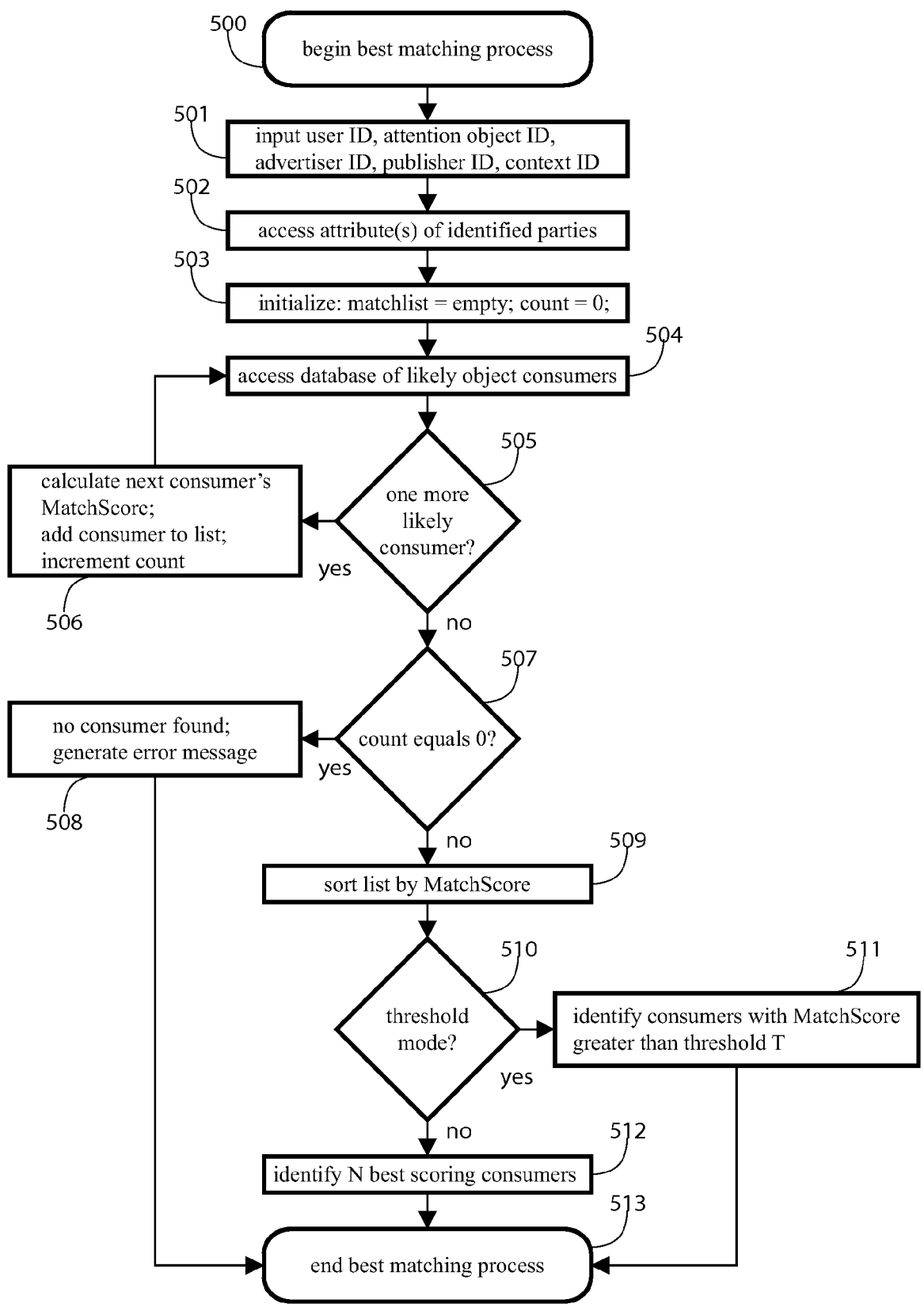
FIG. 5 shows an example flowchart for a matching method.

A possible use of a matching estimator contemplated by this invention is in determining a set of best consumers. An example flowchart for a consumer selection algorithm is shown in FIG. 5, where it is assumed that two parties of the match, the advocate, user B, and the consumption object, BPS C, are fixed, and a set of best consumers for the two parties is to be determined.

The flowchart consists of a number of sequential steps. The matching process begins in step 500. In step 501, the advocate user identifier (ID), the consumption object ID, the advertiser ID (if any), the publisher ID (if any) and the context ID are input to the process in step 501. In step 502, the identifiers are used to index the databases 106-110 to obtain the attributes of related parties to the match. In step 503, the list of matched advocates is initialized as an empty list, with a list member count of zero.

Steps 504-506 are a repetitive loop used to process the database of consumers. In a preferred embodiment, the entries indexed by BPS C in database 110 include a list of likely prospects for consumption of BPS C. In such an embodiment, the list of likely consumer prospects for BPS C is compared to the list of available consumers in database 107 in step 505. If the list of likely prospects for BPS C is not included in database 110, the list of available consumers is checked to see if any qualify as a likely prospect for BPS C in step 505. If there is an unprocessed consumer who is available and qualified, the unprocessed consumer is processed in step 506. In step 506, the potential available and qualified consumer is processed to determine a MatchValue score, and the consumer identifier and associated MatchValue score are added to the match list. Steps 504 and 505 are repeated to see if there is another unprocessed qualified and available consumer, and if so, to continue scoring and adding the consumer(s). The loop continues until all qualified and available consumers are exhausted, at which point step 505 proceeds to step 507.

In step 507, the number of matches in the list is checked. If the count of list members is zero, no consumer was found in the search, an error message is generated in step 508, and the process terminates in step 513. Otherwise, the match list is non-empty, and the list of matching consumers is sorted according to MatchValue in step 509. Step 510 determines how the sorted list is to be further processed. In "threshold mode" all matches with a MatchValue exceeding a threshold T are identified as best consumers in step 511 and the process terminates in step 513. Otherwise, it is assumed that up to N best consumers are desired, where N is a positive integer. In this mode, the top N scoring consumers in the matched list are identified in step 512 and the process terminates in step 513.

D. Determining Actual and Added Value of Advocacy

Figure 6:
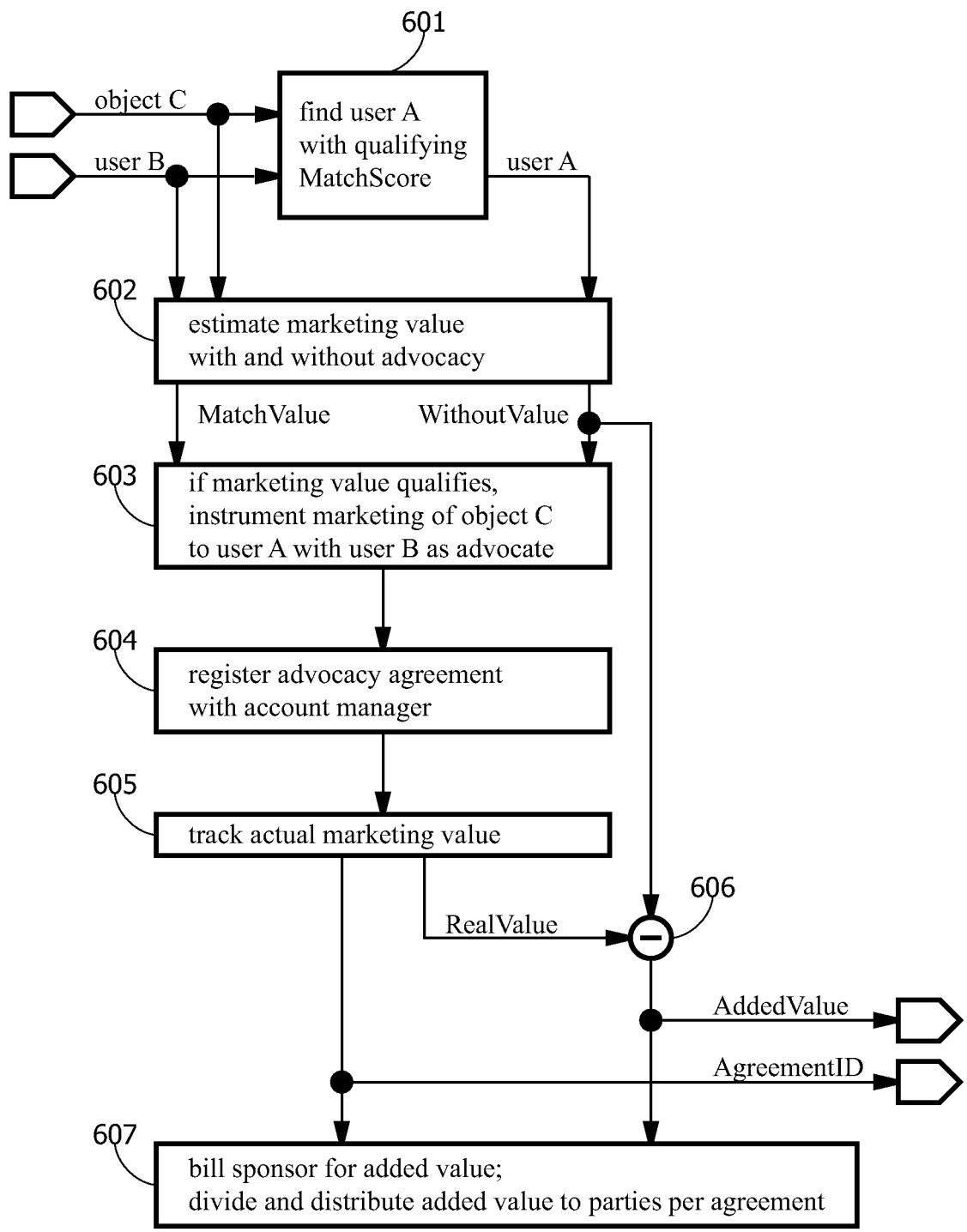
FIG. 6 shows an example valuation unit.

The previous section discusses an example method of finding best advocates for a three-way match. In this section, the actual and added value of advocacy in a three-way match is determined. FIG. 6 is an example signal flow chart to reflect a method of determining these quantities. The AddedValue output of FIG. 6 is also used to provide adaptive matching in an alternative embodiment, discussed further below. As discussed further below, the quantities determined in FIG. 6 may be determined by a number of sub-processes dispersed in time. Each processing block of FIG. 6 is assumed to operate as an independent process with inputs tagged as necessary to maintain the integrity and time alignment of the indicated signal flow.

In FIG. 6, it is assumed that a advocate user B and a BPS C of interest are input to the marketing system. In block 601, a consuming user A with a qualifying match score is determined. This advocate may be determined as a member of the match list of the example matching process of FIG. 5. In an alternative embodiment, a user identifier for user A is supplied by a representative of one of the parties or a third party. In block 602, the marketing value of marketing materials with and without additional advocacy is estimated. In a preferred embodiment, the "MatchValue" output of FIG. 4 represents the expected monetary value of the marketing materials with advocacy by advocate B. The "MatchValue" output from block 602 is scaled if necessary (not shown) to represent this expected monetary value.

In block 602, the expected value of the marketing materials without advocacy is also estimated or determined. In a typical environment, the marketing material is an advertisement placed within a web page. In one embodiment, the value of the advertisement without advocacy is determined by repeatedly running the ad without accompanying advocacy, tracking commercial activity in relation to the ad, and accumulating a measure of the average economic value. For example, a product manufacturer may be willing to pay ten cents per click on a banner advertisement to a service provider. The service provider instruments the advertisement to record and account for each click on the ad, and determines the average value per placed ad without advocacy. In an alternate or augmented embodiment, the service provider estimates the value of one or more advertisements without advocacy, using statistics for similar advertisements in similar product categories and similar contexts. The value of the marketing materials without advocacy is denoted "WithoutValue" at the output of block 602.

In block 603, there is a check to see if there is a reason to provide advocacy because of an increase in expected marketing value with advocacy. If not, the marketing materials are placed without advocacy, and no further processing of advocacy value is required.

If there is an expected increase in marketing value, the marketing materials are augmented to provide user B as a marketing advocate to consuming user A. The marketing materials are preferably instrumented to support one-click communicative access to advocate B, as described above, in block 603. In block 604, the terms of the advocacy contractual arrangement are registered with the account manager 127. Account manager 127 tracks all commercial activity in relation to the advertisement with advocacy, and tracks the actual marketing value of the associated actions. When the marketing campaign has ended for the instrumented marketing materials, the accumulated actual marketing value is output as "RealValue" by block 605.

Block 606 calculates the added value of the advocacy by subtracting the WithoutValue from the RealValue. The advertising client is billed for the RealValue. The AddedValue represents an augmented revenue stream generated by the advocacy. This added value is available to provide advocacy incentives, advocacy costs, service provider costs and a reasonable service provider profit for providing advocacy selection and/or advocacy accounting support. Block 607 assigns the costs of advocacy to an advocacy sponsor, and divides the advocacy revenue to provide advocacy system profit and incentives. In a preferred embodiment, monetary incentives are reserved for expert advocates, and other advocates receive non-monetary incentives.

E. Adaptive Embodiment of Matching System

Figure 8:
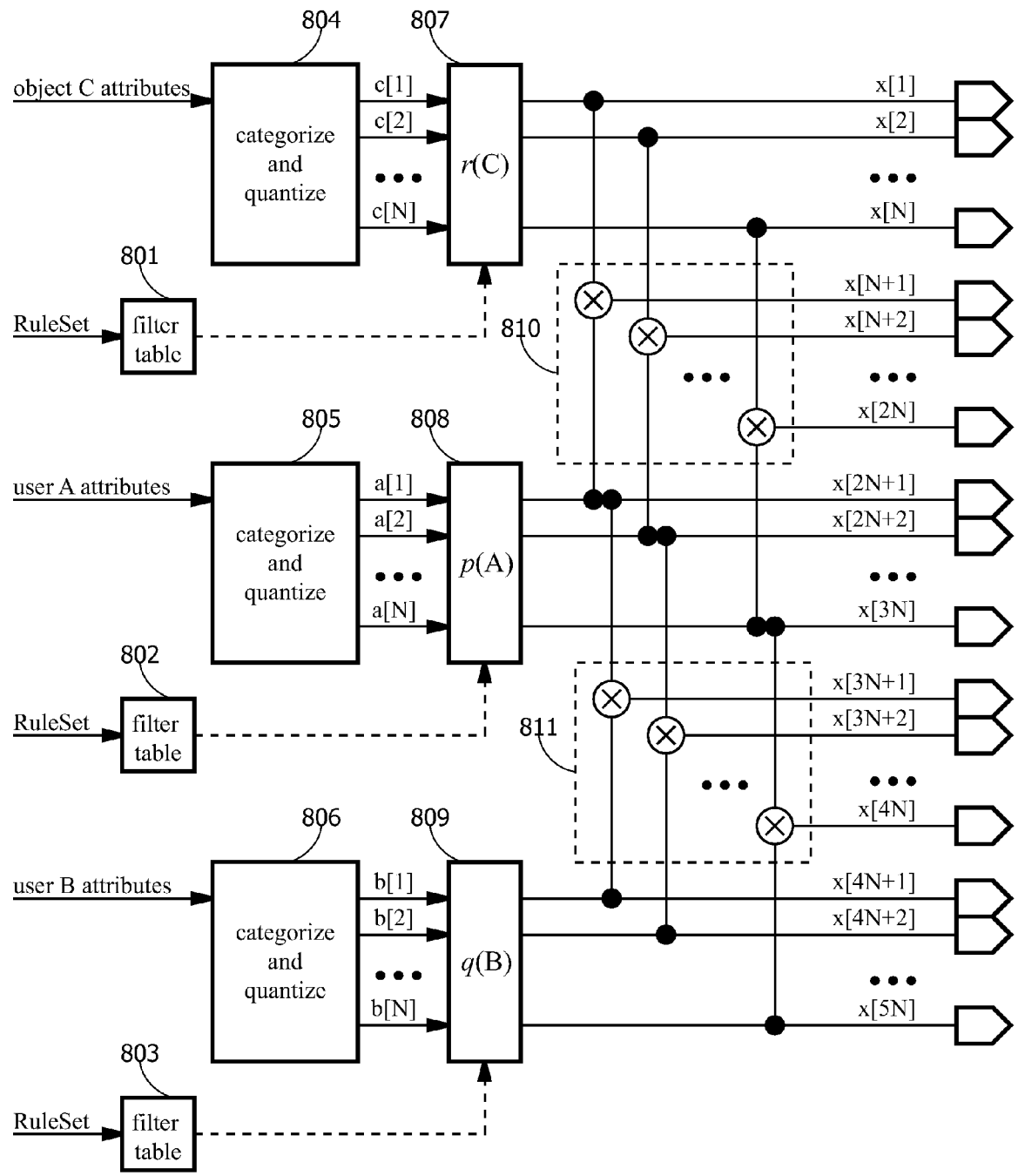
FIG. 8 is the first half of an alternate embodiment of an adaptive value estimator.
Figure 9:
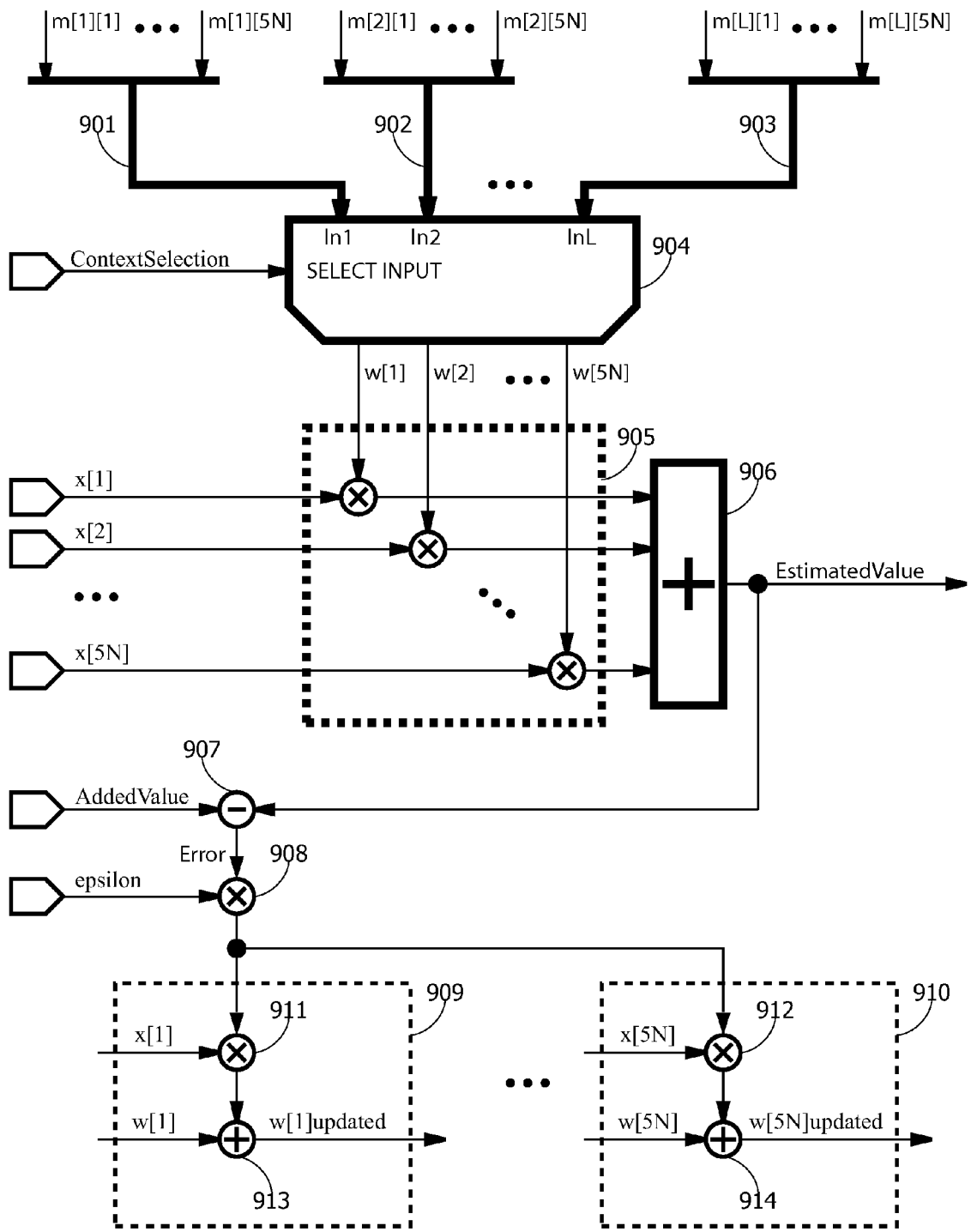
FIG. 9 is the second half of the alternate embodiment.

FIGS. 8 and 9 represent a first and second half of an alternative embodiment of the matching system of Section B above. In Section B, it is assumed that the estimated value of a match may be determined by first determining a number of interim quantities which reflect essential components of a two-way relationship, and second, combining those components into a MatchValue score. FIGS. 8-9 represent an alternative approach, which directly estimates a MatchValue score from primitive attributes without determining interim quantities.

When two of three parties to a match are known, the relationship of the known parties is fixed and the pre-existing value of the relationship is realized without an advocacy matching system. The value of a prospective third party is essentially determined by the relationships of the third party with each of the known parties. When the third party to be determined is a consumer, the advocate's relationship with the product determines a part of the context of the advocate matching, but does not change from one prospective consumer to the next. Ignoring the pre-existing relationship, an optimized search for a consumer is performed by evaluating the relationship of the consumer to the product and the relationship of the advocate to the consumer. The evaluation is performed in a context-dependent manner depending on the consuming user's present relationship with the product, as reflected in a behavioral profile of user actions in a characterized product buying cycle.

A first half of an optimized advocate processor is shown in FIG. 8. In FIG. 8, raw attributes of BPS C, user A, and advocate B are input to categorization and quantization blocks 804-806. The attributes are categorized into N categories, where N is a positive integer, and organized and indexed such that the $i^{th}$ attribute of user A is the same as the $i^{th}$ attribute of user B, and so on. In one embodiment, each attribute reflects a potential quality of the party, and the attributes are quantized positively to reflect the probability that the party possesses the attribute. In cases where it is more probable that the party does not possess the attribute, the attribute may be quantized negatively. For example, if a designated attribute of a user is that the user has a favorite color of red, a quantized value of 0.80 may reflect a probability of 80% that the user's favorite color is red. On the other hand, a quantized value of −0.70 may reflect a probability of 70% that the favorite color of the user is a different color, such as blue. The similarity between two users in terms of preference for red may be taken as the product of the quantized party attributes for the two users.

In FIG. 8, various attributes for any party may be emphasized, de-emphasized, ignored, or rejected by weighting the quantized attributes for the party. Filters 807-809 provide a modified weighting of the quantized attributes of C, A, and B, respectively, using a RuleSet determined from context to index three tables of filter weights, 801-803. The filter weights determine the attribute emphasis or de-emphasis required for the marketing context.

The N weighted attributes of BPS C are denoted x[1] to x[N], the N weighted attributes of advocate B are denoted x[4N+1] to x[5N], and the N weighted attributes of user A are denoted x[2N+1] to x[3N]. The weighted attributes of BPS C are further correlated with the weighted attributes of user A to produce N correlated attributes of the relationship of A and C denoted x[N+1] to x[2N]. The correlations are output by multiplier unit 810. Similarly, the weighted attributes of user A are further correlated with the weighted attributes of advocate B to produce N correlated attributes of the relationship of A and B denoted x[3N+1] to x[4N], output by multiplier unit 811. The 5N outputs of FIG. 8 are further processed in FIG. 9.

In FIG. 9, the estimated value of advocacy is determined as a weighted sum of the 5N outputs of FIG. 8. The tap weights, w[1] to w[5N], are dependent on the marketing context. Multiplexer 904 has L different sets of tap weights as input, with 5N tap weights in each set, and a select control input. Examples sets of input tap weights are denoted 901-903. The output of 904 is a set of weights as determined by a "ContextSelection" input, which selects one of the L tap weight sets as w[1] to w[5N]. Each tap weight w[i] is multiplied by the corresponding $i^{th}$ output of FIG. 8, x[i], in multiplier unit 905. Adder 906 adds the outputs of the multipliers to output an estimated value of the advocacy. In one embodiment, the EstimatedValue output may be used as an alternative to the MatchValue output of FIG. 4.

In a further augmentation of the embodiment, the system adapts the tap weights to refine the predicted advocacy value to better track actual value. Recall that in FIG. 6, the output AddedValue reflects the additional value realized by the provided advocacy. This AddedValue output of FIG. 6 is input to block 907 of FIG. 9, which determines the difference between the EstimatedValue and the AddedValue. The difference, "error," is attributed to estimation error and random system perturbations. The error is scaled by a small quantity, epsilon, in multiplier 908. Units 909 and 910 are example adaptation units for tap weights w[1] and w[5N]. A similar adaptation unit is provided for each tap weight. The output of multiplier 908 is correlated with the inputs to the EstimatedValue filter at the time of estimation in multipliers 911-912. To align the inputs of the adaptation unit, the quantities x[1] to x[5N] may have to be stored for later processing after the AddedValue has been determined. The output of the multipliers 911-912 is a small adjustment to the tap weight, w[1] or w[5N]. The adjustment to tap weight w[1] is accomplished in adder 913, while the adjustment to tap weight w[5N] is accomplished in adder 914.

If the attributes of a consumer-advocate relationship are thought of as contributing a subjective, emotion-based component to marketing decisions, the adaptability of FIGS. 8-9 provides a distinct advantage. A consumer who develops a relationship with an advocate is likely to change subjective components of the advocate evaluation based on the accumulated results of marketing contacts with the advocate. An adaptive system learns the time-varying weights given to various attributes, and adjusts them accordingly.

F. Example Server System

Figure 7:
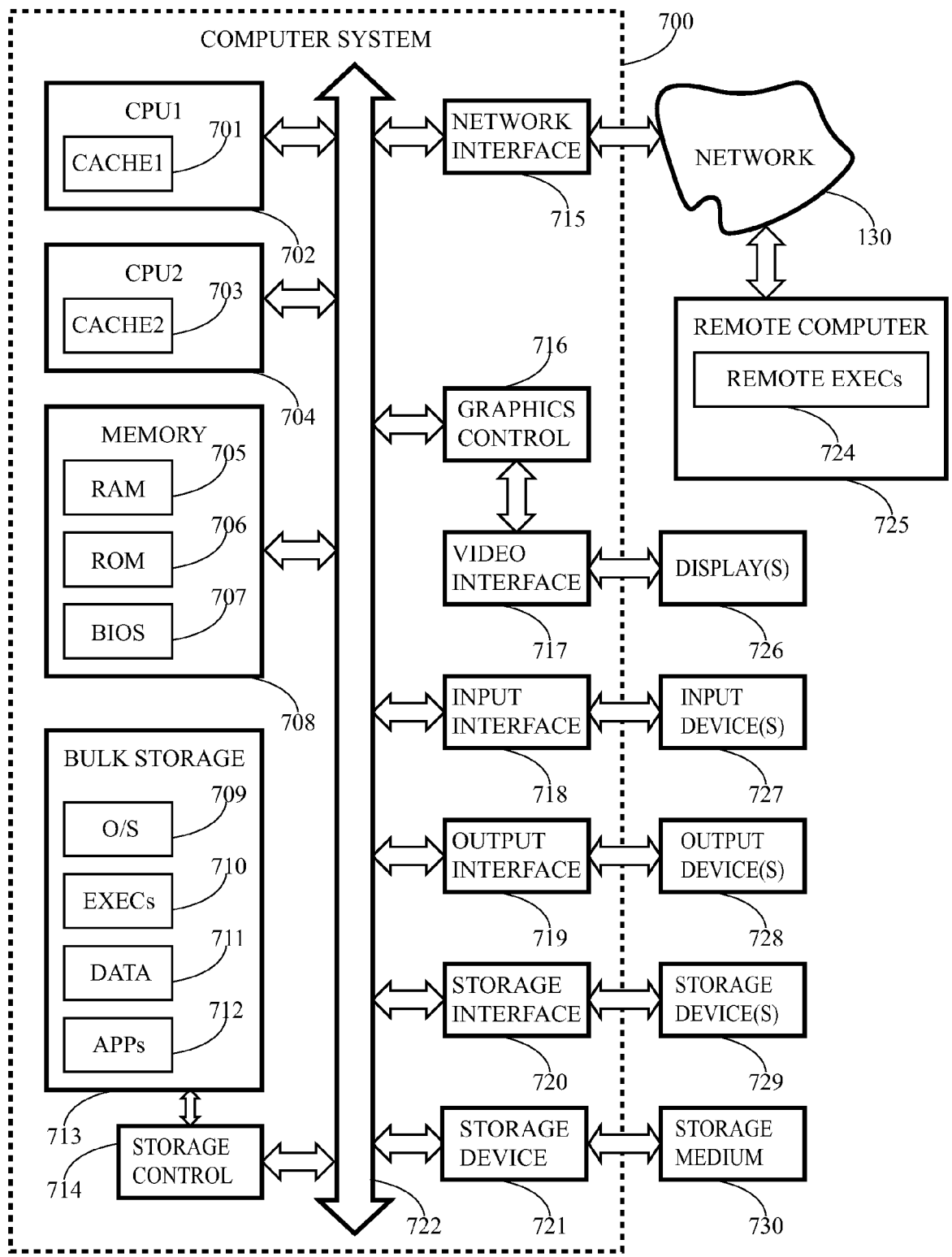
FIG. 7 is a block diagram of an example computer server system.

As indicated above, one or more of the processes of FIGS. 4, 5, and 6, as well as one or more of the processes of FIGS. 8-9 discussed below, may be performed by specialized signal processing hardware, or may be performed using a general-purpose computer implementing a sequence of software steps. The processing may incorporate one or more steps performed on a user's computer system (a "client" system) and one or more steps performed on a service provider's computer system (a "server" system). Server and client systems described herein can be implemented by a variety of computer systems and architectures. FIG. 7 illustrates suitable components in an exemplary embodiment of a general-purpose computer system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computer system environments or configurations.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing the invention may include a general-purpose computer system 700. Computer system 700 accesses one or more applications and peripheral drivers directed to a number of functions described herein. Components of the computer system 700 may include, but are not limited to, a CPU or central processing unit 702, a system memory 708, and a system bus 722 that couples various system components including the system memory 708 to the processing unit 702. As used by those skilled in the art, a signal "bus" refers to a plurality of digital signal lines serving a common function. The system bus 722 may be any of several types of bus structures including a memory bus, a peripheral bus, and a local bus using any of a variety of bus architectures. By way of example, and not limitation, such architectures include the Industry Standard Architecture (ISA) bus, Enhanced ISA (EISA) bus, the Micro Channel Architecture (MCA) bus, the Video Electronics Standards Association local (VLB) bus, the Peripheral Component Interconnect (PCI) bus, the PCI-Express bus (PCI-X), and the Accelerated Graphics Port (AGP) bus.

An operating system manages the operation of computer system 700, including the input and output of data to and from applications (not shown). The operating system provides an interface between the applications being executed on the system and the components of the system. According to one embodiment of the present invention, the operating system is a Windows® 95/98/NT/XP/Vista/Mobile operating system, available from Microsoft Corporation of Redmond, Wash. However, the present invention may be used with other suitable operating systems, such as an OS-X® operating system, available from Apple Computer Inc. of Cupertino, Calif., a UNIX® operating system, or a LINUX operating system.

The computer system 700 may include a variety of computer-readable media. Computer-readable media can be any available media that can be accessed by the computer system 700 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, random access memory (RAM), read-only memory (ROM), electrically erasable programmable ROM (EEPROM), flash memory or other memory technology, compact-disk ROM (CD-ROM), digital versatile disks (DVD) or other optical disk storage, magnetic tape cassettes, magnetic tape, hard magnetic disk storage or other magnetic storage devices, floppy disk storage devices, magnetic diskettes, or any other medium which can be used to store the desired information and which can accessed by the computer system 700.

Communication media may also embody machine-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For instance, communication media includes wired media such as a wired network or direct-wired connection, and wireless media such as acoustic, RF, infrared, cellular networks, and other wireless media.

The system memory 708 includes computer storage media in the form of volatile and/or nonvolatile memory such as read only memory (ROM) 706 and random access memory (RAM) 705. A basic input/output system 707 (BIOS), containing the basic routines that help to transfer information between elements within computer system 700, such as during start-up, is typically stored in ROM 706 and other nonvolatile storage, such as flash memory. Additionally, system memory 708 may contain some or all of the operating system 709, the application programs 712, other executable code 710 and program data 711. Memory 708 typically contains data and/or program modules that are immediately accessible to and/or presently being operated on by CPU 702. Optionally, a CPU may contain a cache memory unit 701 for temporary local storage of instructions, data, or computer addresses.

The computer system 700 may also include other removable/non-removable, volatile/nonvolatile computer storage media. By way of example only, and not by way of limitation, FIG. 7 illustrates a bulk storage unit 713 that reads from or writes to one or more magnetic disk drives of non-removable, nonvolatile magnetic media, and storage device 721 that may be an optical disk drive or a magnetic disk drive that reads from or writes to a removable, a nonvolatile storage medium 730 such as an optical disk or a magnetic disk. Other computer storage media that can be used in the exemplary computer system 700 includes removable or non-removable media and volatile or nonvolatile storage. The storage media includes, but is not limited to, magnetic tape cassettes, flash memory cards, digital versatile disks, digital video tape, solid state RAM, solid state ROM, and the like. Bulk storage 713 and the storage device 721 may be connected directly to the system bus 722, or alternatively may be connected through an interface such as storage controller 714 shown for bulk storage 713. Storage devices may interface to computer system 700 through a general computer bus such as 722, or may interconnect with a storage controller over a storage-optimized bus, such as the Small Computer System Interface (SCSI) bus, the ANSI ATA/ATAPI bus, the Ultra ATA bus, the FireWire (IEEE 1394) bus, or the Serial ATA (SATA) bus.

The storage devices and their associated computer storage media, discussed above and illustrated in FIG. 7, provide storage of computer-readable instructions, executable code, data structures, program modules and other data for the computer system 700. For example, bulk storage 713 is illustrated as storing operating system 709, application programs 712, other executable code 710 and program data 711. As mentioned previously, data and computer instructions in 713 may be transferred to system memory 708 to facilitate immediate CPU access from processor 702. Alternatively, processor 702 may access stored instructions and data by interacting directly with bulk storage 713. Furthermore, bulk storage may be alternatively provided by a network-attached storage device (not shown), which is accessed through a network interface 715.

A user may enter commands and information into the computer system 700 through the network interface 715 or through an input device 727 such as a keyboard, a pointing device commonly referred to as a mouse, a trackball, a touch pad tablet, a controller, an electronic digitizer, a microphone, an audio input interface, or a video input interface. Other input devices may include a joystick, game pad, satellite dish, scanner, and so forth. These and other input devices are often connected to CPU 702 through an input interface 718 that is coupled to the system bus, but may be connected by other interface and bus structures, such as a parallel port, a game port or a universal serial bus (USB). A display 726 or other type of video device may also be connected to the system bus 722 via an interface, such as a graphics controller 716 and a video interface 717. In addition, an output device 728, such as headphones, speakers, or a printer, may be connected to the system bus 722 through an output interface 719 or the like.

The computer system 700 may operate in a networked environment using a network 130 operably connected to one or more remote computers, such as a remote computer 725. The remote computer 725 may be a terminal, a personal computer, a server, a router, a network PC, a peer device or other common network node, and typically includes many or all of the elements described above relative to the computer system 700. The network 130 depicted in FIG. 7 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not by way of limitation, FIG. 7 illustrates remote executable code 724 as residing on remote computer 725. It will be appreciated that the network connections shown are exemplary and other means of establishing a communications link between the computers may be used.

Collectively, these elements are intended to represent a broad category of computer systems, including but not limited to general purpose computer systems based on one or more members of the family of CPUs manufactured by Intel Corporation of Santa Clara, Calif., the family of CPUs manufactured by Advanced Micro Devices (AMD), Inc., of Sunnyvale, Calif., or the family of ARM CPUs, originally designed by Advanced RISC Machines, Ltd., as well as any other suitable processor. Of course, other implementations are possible. For example, the server functionalities described herein may be implemented by a plurality of server sub-systems communicating over a backplane.

Various components of computer system 700 may be rearranged, deleted, or augmented. For example, system bus 722 may be implemented as a plurality of busses interconnecting various subsystems of the computer system. Furthermore, computer system 700 may contain additional signal busses or interconnections between existing components, such as by adding a direct memory access unit (not shown) to allow one or more components to more efficiently access system memory 708.

As shown, CACHE1 and CPU1 are packed together as "processor module" 702 with processor CPU1 referred to as the "processor core." Alternatively, cache memories 701, 703, contained in 702, 704 may be separate components on the system bus. Furthermore, certain embodiments of the present invention may not require nor include all of the above components. For example, some embodiments may include a smaller number of CPUs, a smaller number of network ports, a smaller number of storage devices, or a smaller number of input-output interfaces. Furthermore, computer system 700 may include additional components, such as one or more additional central processing units, such as 704, storage devices, memories, or interfaces. In addition, one or more components of computer system 700 may be combined into a specialized system-on-a-chip (SOC) to further system integration. In some computer system environments where component count is critical, the entire computer system may be integrated in one or more very large scale integrated (VLSI) circuit(s).

As discussed above, in one implementation, operations of one or more of the physical server or client systems described herein is implemented as a series of software routines executed by computer system 700. Each of the software routines comprises a plurality or series of machine instructions to be executed by one or more components in the computer system, such as CPU 702. Initially, the series of instructions may be stored on a storage device, such as bulk storage 713. However, the series of instructions may be stored in an EEPROM, a flash device, or a DVD. Furthermore, the series of instructions need not be stored locally, and could be received from a remote computer 725 or a server on a network via network interface 715.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method comprising:
accessing, by a computing device, a datastore to obtain a plurality of attributes of a marketed object, a plurality of attributes of an advocate of consumption of the marketed object, and attributes of a plurality of network users;
for each of the plurality of network users:
   determining, by the computing device, utilizing the plurality of attributes of the marketed object, the plurality of attributes of the advocate, and the attributes of the plurality of network users,
      a respective first score reflecting social knowledge the respective network user and the advocate have of one another and social connections between the respective network user and the advocate,
      a respective second score reflecting knowledge the respective network user has of the marketed object and the respective network user's purchasing behavior with respect to the marketed object,
      a respective third score reflecting knowledge the advocate has of the marketed object and a connection between the advocate and the marketed object, and
      a respective net value of marketing advocacy reflecting a combination of the first score, the second score and the third score, wherein each of the respective scores is weighted by a respective weighting factor;
sorting, by the computing device, the plurality of network users using the respective net value of marketing advocacy of each respective network user; and
facilitating, by the computing device, communication between the advocate and one of the plurality of network users with a largest net value of marketing advocacy.

2. The method of claim 1, wherein said facilitating communication between the advocate and the one of the plurality of network users further comprises providing instrumentation of a marketing message to the one of the plurality of network user to establish a two-way communication link between the advocate and the one of the plurality of network user instantiated by a single network user interface action.

3. The method of claim 2, wherein said two-way communication link further comprises one or more of a Voice over Internet Protocol (VoIP) call, a telephone call, a cellular phone call, a smart phone call, an instant messaging session, an e-mail communication, a Short Message Service (SMS) protocol message, a text message, or a mail message.

4. The method of claim 1, wherein said determining measures of the objective and subjective further comprises:
dividing, using the computing device, the plurality of attributes of a marketed object, the plurality of attributes of an advocate of consumption of the marketed object, and the attributes of a plurality of network users into groups, one group relevant to knowledge, and one group relevant to connection,
quantizing, using the computing device, the attributes in each group;
determining, using the computing device, the value of each attribute in each group;
combining, using the computing device, the determined values for the group relevant to knowledge to compute a combined knowledge measurement; and
combining, using the computing device, the determined values for the group relevant to connection to compute a combined connection measurement.

5. The method of claim 4, wherein said determining the value of each attribute in the group characterizing a relationship between a party A, a network user, and a party B, an advocate of consumption, further comprises one or more of (a) correlating the quantized value of the attribute for the party A with the quantized value of the corresponding attribute for the party B, (b) determining the difference between the quantized value of the attribute for the party A and the quantized value of the corresponding attribute for the party B, (c) determining the Euclidean distance between the quantized value of the attribute for the party A and the quantized value of the corresponding attribute for the party B, (d) determining the magnitude of the quantized value of the attribute for party A, and (e) determining the magnitude of the quantized value of the attribute for party B.

6. The method of claim 4, wherein said combining the determined values for the group relevant to an attribute further comprises one or more of (a) computing a weighted linear combination of each of the determined values for attributes in the group relevant to the attribute (b) computing a weighted sum of each of the determined values for attributes in the group relevant to the attribute, and (c) computing a weighted sum of the squares of each of the determining values for attributes in the group relevant to the attribute.

7. An apparatus comprising:
a processor;
a storage medium for tangibly storing thereon program logic for execution by the processor, the program logic comprising:
datastore accessing logic executed by the processor for accessing a datastore to obtain a plurality of attributes of a marketed object, a plurality of attributes of an advocate of consumption of the marketed object, and attributes of a plurality of network users;
advocacy value determining logic executed by the processor that
   for each of the plurality of network users,
      determines, utilizing the plurality of attributes of the marketed object, the plurality of attributes of the advocate, and the attributes of the plurality of network users,
         a respective first score reflecting social knowledge the respective network user and the advocate have of one another and social connections between the respective network user and the advocate,
         a respective second score reflecting knowledge the respective network user has of the marketed object and the respective network user's purchasing behavior with respect to the marketed object,
         a respective third score reflecting knowledge the advocate has of the marketed object and a connection between the advocate and the marketed object, and
         a respective net value of marketing advocacy reflecting a combination of the first score, the second score and the third score, wherein each of the respective scores is weighted by a respective weighting factor;
sorting logic executed by the processor for sorting the plurality of network users using the respective net value of marketing advocacy of each respective network user; and communication logic executed by the processor for facilitating communication between the advocate and one of the plurality of network users with a largest net value of marketing advocacy.

8. The apparatus of claim 7, wherein the communication logic additionally comprises logic to provide instrumentation for a marketing message to the one of the plurality of network users to establish a two-way communication link between the advocate and the one of the plurality of network users instantiated by a single network user interface action.

9. The apparatus of claim 8, wherein said two-way communication link further comprises one or more of a Voice over Internet Protocol (VoIP) call, a telephone call, a cellular phone call, a smart phone call, an instant messaging session, an e-mail communication, a Short Message Service (SMS) protocol message, a text message, or a mail message.

10. The apparatus of claim 7, wherein advocacy value determining logic additionally comprises logic for:
dividing the plurality of attributes of the marketed object, the plurality of attributes of the advocate, and the attributes of the plurality of network users into groups, one group relevant to knowledge, and one group relevant to connection,
quantizing the attributes in each group;
determining the value of each attribute in each group;
combining the determined values for the group relevant to knowledge to compute a combined knowledge measurement; and
combining the determined values for the group relevant to connection to compute a combined connection measurement.

11. The apparatus of claim 10, wherein to determine the value of each attribute in the group characterizing a relationship between a party A, a network user, and a party B, an advocate of consumption, further comprises one or more of (a) correlating the quantized value of the attribute for the party A with the quantized value of the corresponding attribute for the party B, (b) determining the difference between the quantized value of the attribute for the party A and the quantized value of the corresponding attribute for the party B, (c) determining the Euclidean distance between the quantized value of the attribute for the party A and the quantized value of the corresponding attribute for the party B, (d) determining the magnitude of the quantized value of the attribute for party A, and (e) determining the magnitude of the quantized value of the attribute for party B.

12. The apparatus of claim 10, wherein to combine the determined values for the group relevant to an attribute further comprises one or more of (a) computing a weighted linear combination of each of the determined values for attributes in the group relevant to the attribute (b) computing a weighted sum of each of the determined values for attributes in the group relevant to the attribute, and (c) computing a weighted sum of the squares of each of the determining values for attributes in the group relevant to the attribute.

* * * * *